United States Patent
Shormann

(10) Patent No.: US 10,858,088 B2
(45) Date of Patent: Dec. 8, 2020

(54) BIOMIMETIC AIRFOIL BODIES AND METHODS OF DESIGNING AND MAKING SAME

(71) Applicant: David E. Shormann, Haleiwa, HI (US)

(72) Inventor: David E. Shormann, Haleiwa, HI (US)

(*) Notice: Subject to any disclaimer, the term of this patent is extended or adjusted under 35 U.S.C. 154(b) by 698 days.

(21) Appl. No.: 15/689,831

(22) Filed: Aug. 29, 2017

(65) Prior Publication Data
US 2018/0057141 A1    Mar. 1, 2018

Related U.S. Application Data

(60) Provisional application No. 62/533,456, filed on Jul. 17, 2017, provisional application No. 62/381,813, filed on Aug. 31, 2016.

(51) Int. Cl.
*B64C 3/14*    (2006.01)
*B64C 21/10*   (2006.01)
(Continued)

(52) U.S. Cl.
CPC ............... *B64C 3/14* (2013.01); *B64C 11/18* (2013.01); *B64C 21/00* (2013.01); *B64C 21/10* (2013.01); *F01D 5/141* (2013.01); *F01D 9/041* (2013.01); *F03B 17/061* (2013.01); *F03D 1/0633* (2013.01); *F04D 29/18* (2013.01); *F04D 29/24* (2013.01); *B64C 2003/142* (2013.01); *B64C 2003/146* (2013.01); *B64C 2003/147* (2013.01);
(Continued)

(58) Field of Classification Search
CPC . B64C 11/18; B64C 11/205; B64C 2201/108; B64C 27/467; F03D 1/0633
See application file for complete search history.

(56) References Cited

U.S. PATENT DOCUMENTS

| 5,088,665 A | 2/1992 | Vijgen et al. |
| 5,901,925 A | 5/1999 | McGrath et al. |

(Continued)

FOREIGN PATENT DOCUMENTS

| CN | 104180503 A | 12/2014 |
| DE | 102009035689 | 2/2011 |

(Continued)

OTHER PUBLICATIONS

Written Opinion dated Apr. 29, 2020 in related Singapore Patent Application No. 11201901416Y (6 pages).
(Continued)

*Primary Examiner* — Brian M O'Hara
(74) *Attorney, Agent, or Firm* — Pizarro Allen PC

(57) ABSTRACT

An airfoil body may include a plurality of tubercles along a leading edge of the airfoil body and a plurality of crenulations along a trailing edge of the airfoil body, wherein at least one of a position, a size, and a shape of the plurality of tubercles and the plurality of crenulations varies in a non-periodic fashion. The non-periodic fashion may be according to a Fibonacci function and may mimic the configuration of a pectoral fin of a humpback whale. The tubercles and crenulations may be defined with respect to a pivot point. The spanwise profile, including the max chord trailing edge curvature, may closely follow divine spirals and related Fibonacci proportions. The spanwise chord thickness may vary in a nonlinear pattern. Related methods are also described.

20 Claims, 17 Drawing Sheets

(51) Int. Cl.

| | | |
|---|---|---|
| *F04D 29/18* | (2006.01) | |
| *F04D 29/24* | (2006.01) | |
| *F01D 9/04* | (2006.01) | |
| *F03D 1/06* | (2006.01) | |
| *F03B 17/06* | (2006.01) | |
| *B64C 11/18* | (2006.01) | |
| *B64C 21/00* | (2006.01) | |
| *F01D 5/14* | (2006.01) | |

(52) U.S. Cl.
CPC ..... *B64C 2003/148* (2013.01); *F05B 2200/00* (2013.01); *F05B 2240/30* (2013.01); *F05B 2250/15* (2013.01); *F05B 2250/18* (2013.01); *F05D 2200/20* (2013.01); *F05D 2240/30* (2013.01); *F05D 2250/15* (2013.01); *F05D 2250/182* (2013.01); *F05D 2250/183* (2013.01); *F05D 2250/184* (2013.01); *F05D 2250/25* (2013.01); *F05D 2250/293* (2013.01); *F05D 2250/294* (2013.01); *Y02E 10/20* (2013.01); *Y02E 10/72* (2013.01); *Y02T 50/60* (2013.01)

(56) References Cited

U.S. PATENT DOCUMENTS

| | | | | |
|---|---|---|---|---|
| 6,000,911 | A * | 12/1999 | Toulmay | B64C 27/463 416/223 R |
| 6,431,498 | B1 | 8/2002 | Watts et al. | |
| 7,244,157 | B2 | 7/2007 | Simpson | |
| 8,328,522 | B2 * | 12/2012 | Harman | F04D 29/384 416/223 R |
| 8,535,008 | B2 | 9/2013 | Dewar et al. | |
| 8,777,573 | B2 * | 7/2014 | Hibbard | F03D 1/0675 416/132 B |
| 8,920,270 | B2 | 12/2014 | DeLap et al. | |
| 9,199,718 | B2 * | 12/2015 | Fogarty | A63H 33/18 |
| 9,308,418 | B2 | 4/2016 | Davis et al. | |
| 9,328,717 | B1 * | 5/2016 | Walker | F03D 3/005 |
| 9,341,158 | B2 | 5/2016 | Smith et al. | |
| 9,364,717 | B2 | 6/2016 | Davis et al. | |
| 9,669,905 | B1 | 6/2017 | Pierce et al. | |
| 10,415,581 | B1 * | 9/2019 | Seeley | B64C 11/20 |
| 2006/0060721 | A1 | 3/2006 | Watts et al. | |
| 2013/0164488 | A1 | 6/2013 | Wood et al. | |
| 2014/0286784 | A1 | 9/2014 | Singh | |
| 2014/0338388 | A1 | 11/2014 | Kim et al. | |
| 2015/0196808 | A1 | 7/2015 | Davis et al. | |
| 2017/0175531 | A1 | 6/2017 | Beckman et al. | |

FOREIGN PATENT DOCUMENTS

| | | | | |
|---|---|---|---|---|
| DE | 102009035689 | A1 * | 2/2011 | F03D 1/0608 |
| WO | WO 2016/090422 | | 6/2016 | |

OTHER PUBLICATIONS

Scheinbaum, Chase, "The Future of Surfboard Fin Design Might Be Millions of Years Old," Feb. 1, 2017, http://www.theinertia.com/surf/the-future-of-surfboard-fin-design-might-be-millions-of-years-old/ (7 pages).

Hamilton, Tyler, "Whale-Inspired Wind Turbines," Mar. 6, 2008, https://www.technologyreview.com/s/409710/whale-inspired-wind-turbines/ (7 pages).

"Flippers provide lift, reduce drag," Dec. 2, 2015, https://asknature.org/strategy/flippers-provide-lift-reduce-drag/#Wh3IN8-Wycw (7 pages).

Scheinbaum, Chase, "Kelly Slater Rocked Funky, Whale-Inspired Fins on His Pipe Backup Board," Dec. 21, 2016, http://www.theinertia.com/surf/kelly-slater-rocked-funky-whale-inspired-fins-on-his-pipe-backup-board/ (5 pages).

PCT International Search Report and Written Opinion issued in International Patent App. No. PCT/US2017/049513 on Nov. 13, 2017 (10 pages).

Livio, Mario, "The Golden Ratio: The Story of Phi, the World's Most Astonishing Number," 2002, pp. 115-121 and 173, Broadway Books, New York, NY, United States (9 pages).

Stanway, Michael Jordan, "Hydrodynamic effects of leading-edge tubercles on control surfaces and in flapping foil propulsion," Thesis Submitted to the Department of Mechanical Engineering at Mass. Inst. of Technology on Jan. 22, 2008, p. 2, Cambridge, MA, United States (3 pages).

Abbott, Ira H., et al., "National Advisory Committee for Aeronautics Report No. 824: Summary of Airfoil Data," Jan. 1, 1945, pp. 75-87, Langley Field, VA, United States (15 pages).

Shi, Weichao, et al., "Biomimetic improvement for a tidal turbine blade," Proceedings of the 11th European Wave and Tidal Energy Conference Sep. 6-11, 2015, Nantes, France, School of Marine Science and Technology, Newcastle University, United Kingdom (7 pages).

Hansen, Kristy, et al., "Reduction of Flow Induced Airfoil Tonal Noise Using Leading Edge Sinusoidal Modifications," Acoustics Australia, vol. 40, No. 3, Dec. 2012, pp. 172-177, School of Mechanical Engineering, University of Adelaide, Adelaide, Australia (6 pages).

Fish, Frank E., et al., "Hydrodynamic design of the humpback flipper," Journal of Morphology, Jul. 1995, pp. 51-60, Department of Biology, West Chester University, West Chester, PA, United States (11 pages).

Hansen, Kristy, et al., "Performance Variations of Leading-Edge Tubercles for Distinct Airfoil Profiles," AIAA Journal, Jan. 2011, pp. 185-194, University of Adelaide, Adelaide, South Australia, Australia (11 pages).

"Surrator—Product," https://www.lairdstandup.com/productisurrator/—Accessed Aug. 28, 2016 (2 pages).

Aftab, S.M.A., et al., "Mimicking the humpback whale: An aerodynamic perspective," Progress in Aerospace Sciences, vol. 84, Jun. 22, 2016, pp. 48-69 (23 pages).

Johari, Hamid, "Applications of Hydrofoils with Leading Edge Protuberances," Final Technical Report for Office of Naval Research contract N00014-08-1-1043 covering the period Aug. 1, 2008 to Dec. 31, 2011, Mechanical Engineering Department, California State University, Northridge, CA (124 pages).

Miklosovic, D. S., et al., "Leading-edge tubercles delay stall on humpback whale (*Megaptera novaengliae*) flippers," Physics of Fluids, vol. 16, No. 5, May 2004, pp. L39-L42 (4 pages).

Miklosovic, David S. et al., "Experimental Evaluation of Sinusoidal Leading Edges," Journal of Aircraft, vol. 44, No. 4, Jul.-Aug. 2007, pp. 1404-1407 (4 pages).

MIT Sea Grant, Oct. 2011, Sea Perch Construction manual http://seaperch.mit.edu/docs/seaperch-build-october2011.pdf (50 pages).

Supplementary Search Report dated Mar. 20, 2020 in related European Patent Application No. 17847522.4 (9 pages).

* cited by examiner $$F_x = \frac{1}{\sqrt{5}}\left\{(\phi)^x - \left(\frac{1}{\phi}\right)^x \cos(\pi x)\right\}, \text{ where } \phi = 1.618$$

$$FM_x = \left|\frac{0.1\phi}{\sqrt{5}}\left\{(\phi)^{-x} - \left(\frac{1}{\phi}\right)^{-x} \cos\left(\left(\frac{360}{137.5}\right)\pi(-x)\right)\right\}\right|^{\frac{1}{\phi}}$$

For 14, $\dfrac{W}{SK} \approx \phi$

BIOMIMETIC AIRFOIL BODIES AND METHODS OF DESIGNING AND MAKING SAME

CROSS-REFERENCE TO RELATED APPLICATIONS

This application claims priority to U.S. Provisional Patent Application No. 62/381,813 filed Aug. 31, 2016, and U.S. Provisional Patent Application No. 62/533,456 filed Jul. 17, 2017.

COPYRIGHT NOTICE

This application contains material that is subject to copyright protection. Such material may be reproduced exactly as it appears in Patent and Trademark Office patent files or records. The copyright owner otherwise reserves all rights to such material.

FIELD

The present disclosure relates to devices used for passive flow control over airfoil and hydrofoil bodies. More particularly, the present disclosure relates to passive fluid flow control devices designed for optimizing performance of airfoil and hydrofoil bodies.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Observe just about any manmade, high aspect ratio (AR>3 for a fin) airfoil-shaped body that operates at high Reynold's numbers (Re>500,000) and one will see a relatively straight leading edge, not unlike a bird's wing. However, most birds don't fly at high Re, so they may not provide the best example for designers seeking to optimize performance of airfoil or hydrofoil bodies operating at high Re. Another reason for the straight leading edge is ease of manufacturing. Fortunately, advances in manufacturing techniques like 3D printing are allowing designers to design and test more complex shapes such as those typically found in natural creation.

Some may ignore these more complex shapes, assuming they are purposeless evolutionary holdovers from the distant past. Instead, what if a more biomimetic approach is taken, where natural creation is assumed to be purposely designed for optimum performance? For example, the leading and trailing edges of a humpback whale's pectoral fins are not straight and smooth. But, if the complex patterns existing on a humpback whale's pectoral fin did not help the whale perform optimally during feeding, the animal would, at best, expend more energy than necessary, and at worst, starve. Biomimetics is a field devoted to unlocking the mystery behind designs found in natural creation in order to utilize them on manmade devices.

One mystery recently uncovered involves the passive flow control provided by the protuberances, or bumps, found on the leading edge of the pectoral fins of the humpback whale (*Megaptera novaeangliae*). When observed for the first time, an initial thought is that the bumps are on the wrong side of the fin. Humans are trained to believe that leading edges are supposed to be straight and smooth. The pectoral fins of humpback whales lie in stark contrast, possessing a series of up to 13 protuberances along the leading edge and tip. Most commonly referred to as tubercles, the bumps go by many other names as well, such as sinusoidal leading edge, scalloped leading edge, wavy leading edge, and serrated planform lifting surface.

The underwater acrobatics these massive, 60,000 lb leviathans are known for is accomplished largely by their pectoral fins. With a genus name (Megaptera) that means "giant wing," it is no surprise that the humpback's pectoral fins are the largest of any whale. The whale's incredible size also generates a tremendous amount of inertia, which means at times they need a wing that efficiently generates lift in a high Reynolds number environment. The Reynolds number (Re) is a dimensionless quantity used to compare the relative importance of inertia forces to viscous forces. Larger objects, like whales, have more inertia than smaller objects like microscopic plankton, which would be more influenced by viscous forces. Therefore, in a high Re environment, inertia forces dominate, while viscous forces dominate in a low Re environment.

Through videos as well as personal underwater viewing of humpback whales in Hawaii, the present inventor has observed humpbacks turning sharply while moving fast (high Re), as well as accelerating rapidly from a resting position (Re=0). They initiate motion with a kick of the fluke, while simultaneously using their pectoral fins like paddles to flap, scoop and pull themselves forward. As they gain momentum, inertia forces start to dominate, and a low-drag, high lift fin is now required. But they also use them like rotor blades, rapidly rotating them forward to generate massive amounts of lift, with tip speeds approaching 20 mps (45 mph). In order to move them so rapidly, their fins need high lift per unit volume. A higher-volume fin generating the same amount of lift would respond slower (more inertia to overcome). They use their pectoral fin-generated lift in different ways, including, but not limited to, lunging upwards while feeding, making steep banking turns, initiating dives, or simply breaching for the fun of it.

Whale researchers tend to agree that humpbacks are by far the most maneuverable of the whales. But, conventional fluid dynamics teaches that while high aspect ratio airfoil shapes like the humpback possesses are more efficient than lower aspect ratio shapes, they have poor maneuverability. In other words, high aspect ratio airfoil shapes tend to stall at lower angles of attack than low aspect ratio shapes. A high angle of attack (aoa) is typically greater than about 10°, but may vary depending on the airfoil shape. Consider also that a humpback's pectoral fins must perform optimally under a variety of conditions, including in close proximity to other whales near the surface of a choppy sea, where turbulent flow is the rule rather than the exception.

What then, is so unique about a humpback whale's pectoral fins that allow it to defy standard fluid dynamics principles by integrating maneuverability with a high aspect ratio? Fish and Battle's 1995 research paper (referenced below) on the hydrodynamic design of the humpback whale flipper, as well as U.S. Pat. No. 6,431,498, sparked interest in the use of tubercles as passive, leading edge flow control devices. It is now clear that tubercles can improve the performance of airfoil-shaped bodies. As air passes over a tubercle, a pair of counter-rotating, streamwise vortices are generated, one on each side of a tubercle. The vortex pair helps energize the boundary layer and keep it attached over a wider range of speeds and angles of attack. In other words, research shows that addition of tubercles can delay stall (see Miklosovic et al. 2004, Aftab et al. 2016 below), which can significantly increase the maneuverability of a high-aspect ratio, airfoil-shaped body.

The generation of streamwise vortices may also result in a decrease in turbulence around the airfoil, which in turn can reduce tonal noise (see Hansen 2012 below). Improved performance of tubercled leading edges has been tested and verified on a number of fixed and rotating airfoil-shaped bodies, over a wide range of Reynolds numbers in both air and water. High Re conditions tend to show the best improvements, with low Re (<300,000) sometimes producing negative results like decreased lift and increased drag for pre-stall conditions (see Hansen et al. 2011 and Aftab et al. 2016 below). Certain applications of this biomimetic device to airfoil-shaped bodies can result in improvements such as more fuel efficient aircraft and ships, more energy efficient turbines used for generating electricity, and enhanced maneuverability of high-aspect ratio airfoil-shaped bodies.

But a review of recent literature by the present inventor and others (see Aftab et al. 2016 below) reveals scientists and patent holders are unsure of the proper shape, position, and number of leading edge tubercles. Some patents even appear to place tubercles on the wrong side (tubercles go on the leading edge), such as on swimming paddles (U.S. Pat. No. 9,308,418). While varying degrees of improvement may be seen with these different designs, some of it may not be related to tubercle applications.

Regarding the humpback whale's pectoral fin, the standard biomimetic research method has been to perform tests on highly idealized airfoil shapes that focus almost exclusively on the number of leading edge tubercles and/or their shape. Almost without exception, the shape chosen is a periodic, sinusoidal pattern, where the amplitude and wavelength are kept constant or varied only in proportion to chord length (U.S. Pat. No. 6,431,498).

But upon closer inspection of a humpback whale's pectoral fin, the keen observer will notice leading edge tubercles are not the only passive flow control device present. Along the trailing edge of the wingtip, a series of crenulations appears. Notably, some trailing edge patterns are known to improve performance of airfoil-shaped bodies (U.S. Pat. No. 5,088,665), and some non-periodic trailing edge patterns are known to create vortices that tend to cancel one another, thereby reducing drag and turbulence (U.S. Pat. No. 9,341,158).

Continuing on down the trailing edge towards the root of a humpback whale's pectoral fin, the trailing edge curvature reaches a maximum chord length just outboard of the root. An increase in chord near the root is known to artisans skilled in designing rotating airfoil shapes, where rotation speed varies directly with span. For example, if the speed of the rotor tip is 40 m/s, then the speed at one-quarter of the distance from the root or hub is 10 m/s. A wider chord near the root is advantageous at the lower speeds because lower speeds generate less turbulence and more lift can be achieved by a larger lifting surface. The increased chord near the root is also a clue that the humpback uses its pectoral fins like rotors at times.

At the root, the chord decreases from the maximum chord length noted above. The shorter chord at the root is coupled with an increased airfoil maximum thickness that is positioned relatively closer to the leading edge than the more outboard max chord thickness locations. Fluid dynamics teaches that this arrangement reduces interference drag (U.S. Pat. No. 7,244,157), which is the drag that occurs at the intersection of an airfoil shape and the body to which the airfoil is connected (e.g., where the root of a whale's pectoral fin intersects its body).

Another flow control device considered involves local maximum chord thicknesses occurring at two locations just outboard of the root. A standard airfoil-shaped body would have the maximum chord thickness at the root, decreasing in a linear fashion towards the tip. By contrast, the humpback whale's nonlinear, spanwise variation of maximum chord thickness tends to channelize the flow, creating a path for the flow and in effect breaking the long, high aspect ratio pectoral fin into several, smaller bodies. Leading edge tubercles also create localized peaks and troughs, but the patterns normally don't extend to the trailing edge.

A need exists for a method and apparatus to improve the performance of airfoil-shaped bodies over a wide range of conditions. Aftab et. al.'s 2016 review (referenced below) emphasized the need for more research on amplitude and wavelength selection of leading edge tubercles for a particular airfoil. No doubt, this is an important consideration. But, is it the only consideration? Is it possible that previous efforts to mimic the humpback whale's pectoral fin, are, like Ptolemy's geocentrism of old, satisfactory in many ways, yet missing key components? What if the arrangements of other passive flow control devices on humpback whale fins are as important to follow for optimization of those devices as Kepler's laws are for more accurately describing planetary motion?

In other words, what if designs that only focus on manipulating leading edge tubercles are too simplistic? What would happen if, instead, one sought a more holistic, biomimetic method allowing one to design an airfoil or hydrofoil more like an actual humpback's pectoral fin? It is the present inventor's belief that the present disclosure satisfies these and other needs and may provide further related advantages such as improved lift, reduced drag and associated turbulence, enhanced stability and maneuverability, and a more aesthetically pleasing shape.

SUMMARY

The answer to finding a more holistic method begins by going back in time over 2,300 years ago, when Euclid formally defined the ratio of mean to extreme. Take a line segment and split it into two unequal pieces so that the ratio of the whole length to the larger piece equals the ratio of the larger piece to the smaller piece. The ratio results in an irrational number, which rounded equals 1.618. Other names for this ratio include the golden ratio, phi (φ), or Leonardo da Vinci and Johannes Kepler's favorite, the divine proportion.

In the 1200's, Leonardo of Pisa, also known as Fibonacci, introduced from India what are now known as Fibonacci numbers. In the early 1600's, Kepler proved that Fibonacci numbers are closely related to the divine proportion. The sequence of Fibonacci numbers is defined by a recurrence relation, where each subsequent element of the sequence is the sum of the previous two. The first 10 terms of a standard Fibonacci sequence are 0, 1, 1, 2, 3, 5, 8, 13, 21, 34. As the sequence approaches infinity, the ratio of any two adjacent elements approaches 1.618, the divine proportion.

The Greek letter phi (φ) was chosen to represent the divine proportion because of Phidias, who apparently used it in constructing the rectangular Parthenon. Leonardo da Vinci used phi in many of his paintings, including The Last Supper and Salvador Mundi. Many computer algorithms employ the Fibonacci sequence. PhiMatrix™ software (Phipoint Solutions, LLC, Brentwood, Tenn.) allows photographers and designers to use the divine proportion to discern the most eye-pleasing arrangements.

Luca Pacioli, the father of accounting and da Vinci's friend, titled his 1509 book "The Divine Proportion," alluding to God's use of phi in creation. Indeed, many examples from nature are documented, perhaps the most famous being the nautilus shell and the way its curvature closely follows the pattern of a type of logarithmic spiral known as a divine spiral. Divine spirals are formed by drawing a series of nested divine rectangles (rectangles whose ratio of length to width equals phi). This in turn creates a series of squares, and radii drawn within the squares connect to form the spiral. A unique attribute of divine spirals is self-similarity, the ability to look the same (have the same curvature) regardless of scale. The famous mathematician Jacques Bernoulli was so fascinated by divine spirals that, on his tombstone he requested they engrave the phrase, "Although changed, I rise again the same." Other examples of the divine proportion include the spirals on a pineapple, the arrangement of seeds on a sunflower, or the Modulor, a proportional system developed by Charles-Eduoard Jeanneret in the 1900's that applied the divine proportion to human anatomy.

But until the present disclosure, no one has documented the apparent use of the divine proportion on the highly maneuverable, high aspect ratio flippers of animals like humpback whales. Just as the divine proportion may be used as a tool to understand how the sunflower achieves the closest packing of seeds, the present inventor believes the divine proportion may serve as a tool to understand how the humpback whale optimizes fluid flow over a wide range of speeds, fin positions, and flow conditions ranging from laminar to turbulent. More specifically, the present inventor believes that God revealed to him that many aspects of the humpback whale's pectoral fin shape mimic patterns associated with the divine proportion and related mathematical patterns such as the Fibonacci sequence, Fibonacci function, and divine spirals. The present disclosure provides an apparatus and methods for applying these patterns to any airfoil-shaped body for the purpose of improving its performance. As discussed further below, preliminary results from CFD (computational fluid dynamics) tests, wind turbine tests, tidal turbine tests, and surfing fin tests reveal that significant performance gains may result when applying embodiments of the methods and apparatus described herein.

As described in more detail below, some embodiments of the methods and apparatus described herein may feature a biomimetic arrangement of passive flow control devices including 13 leading edge tubercles, 8 trailing edge crenulations, a max chord trailing edge curvature, airfoil cross sections similar to NACA 00xx and NACA 6 series airfoils, and an overall spanwise profile mapped using divine spirals. Some embodiments may contain tubercles and/or crenulations, which may vary in a non-periodic fashion. Also, in some embodiments, moving outboard from the root, the chord thickness may vary in a nonlinear fashion.

In some embodiments, after making a basic sketch of the spanwise profile for a desired airfoil shape, a designer may place a first point at the leading edge root base and a second point directly beneath the first point that represents a pivot point. On a humpback whale, the pivot point represents the location of the shoulder socket, but in other applications such a point might represent, among other things, the center of the hub on a propeller, the center of a fuselage on an aircraft, or the ball of a surfer's foot on a surfboard. From the pivot point, a third point may be located at the wingtip that represents the maximum distance (e.g., max wingspan) from the pivot point. This third point may define the location of a tubercle T11 as described below. After this location is defined, the remaining tubercles, crenulations, max chord trailing edge curvature and root chord length may all be mapped. In other words, in some embodiments, all a designer needs is a spanwise profile of a desired airfoil-shaped body, plus three other points, to begin mapping a humpback whale's passive flow control devices onto the airfoil shape.

In some embodiments, an airfoil body may include a plurality of tubercles along a leading edge of the airfoil body and/or a plurality of crenulations along a trailing edge of the airfoil body, wherein at least one of a position, a size, and a shape of the plurality of tubercles and the plurality of crenulations varies in a non-periodic fashion. The non-periodic fashion may be according to a Fibonacci function and may mimic the configuration of a pectoral fin of a humpback whale.

In some embodiments, a method of designing or making an airfoil body having a plurality of tubercles along a leading edge of the airfoil body and/or a plurality of crenulations along a trailing edge of the airfoil body may include: establishing a leading edge point of a root chord of the airfoil body; establishing a pivot point inboard of the root chord; establishing a max span point corresponding to a peak of an outermost tubercle; and establishing the plurality of tubercles, the plurality of crenulations, the max chord trailing edge curvature, and finally the nonlinear spanwise max chord thickness, all based on Fibonacci proportions with respect to a maximum span segment between the pivot point and the max span point.

In some embodiments, an airfoil body may include (a) a plurality of leading edge tubercles arranged in Fibonacci proportions and/or (b) a plurality of trailing edge crenulations arranged in Fibonacci proportions.

In some embodiments, an airfoil body may include a non-linear spanwise variation of max chord thickness. In some embodiments, the airfoil body may include a root chord and a maximum chord thickness, and the maximum chord thickness may be outboard of the root chord.

In some embodiments, an airfoil body may include a planform shape defined at least in part by at least one divine spiral. In some embodiments, the planform shape may include a leading edge defined at least in part by a first divine spiral, a tip defined at least in part by a second divine spiral, and a trailing edge defined at least in part by a third divine spiral. In some embodiments, the planform shape may include a max trailing edge curvature defined at least in part by a fourth divine spiral.

The significance of the present disclosure lies not only in the improved performance as revealed by preliminary research described below, but also in the ease of placing the more aesthetically-pleasing pattern of a humpback whale's pectoral fin onto just about any airfoil-shaped body. There is also the potential for significant commercial value realized by having humpback whale-shaped patterns. It is the inventor's belief that, given a choice, if a consumer knows a product mimics a humpback whale in a way that also improves performance, the consumer will be more likely to purchase that product over other designs.

Other features and advantages of the present disclosure will become apparent from the following detailed description, taken in conjunction with the accompanying drawings and tables, which illustrate, by way of example, the principles of some exemplary and non-limiting embodiments of the invention.

BRIEF DESCRIPTION OF THE TABLES

Table 1) Fibonacci ratios associated with primary tubercles.

Table 2) Wavelength, skew and amplitude of tubercles.

Table 3) Wavelength, skew and amplitude of crenulations and max trailing edge curvature.

Figure 14A:
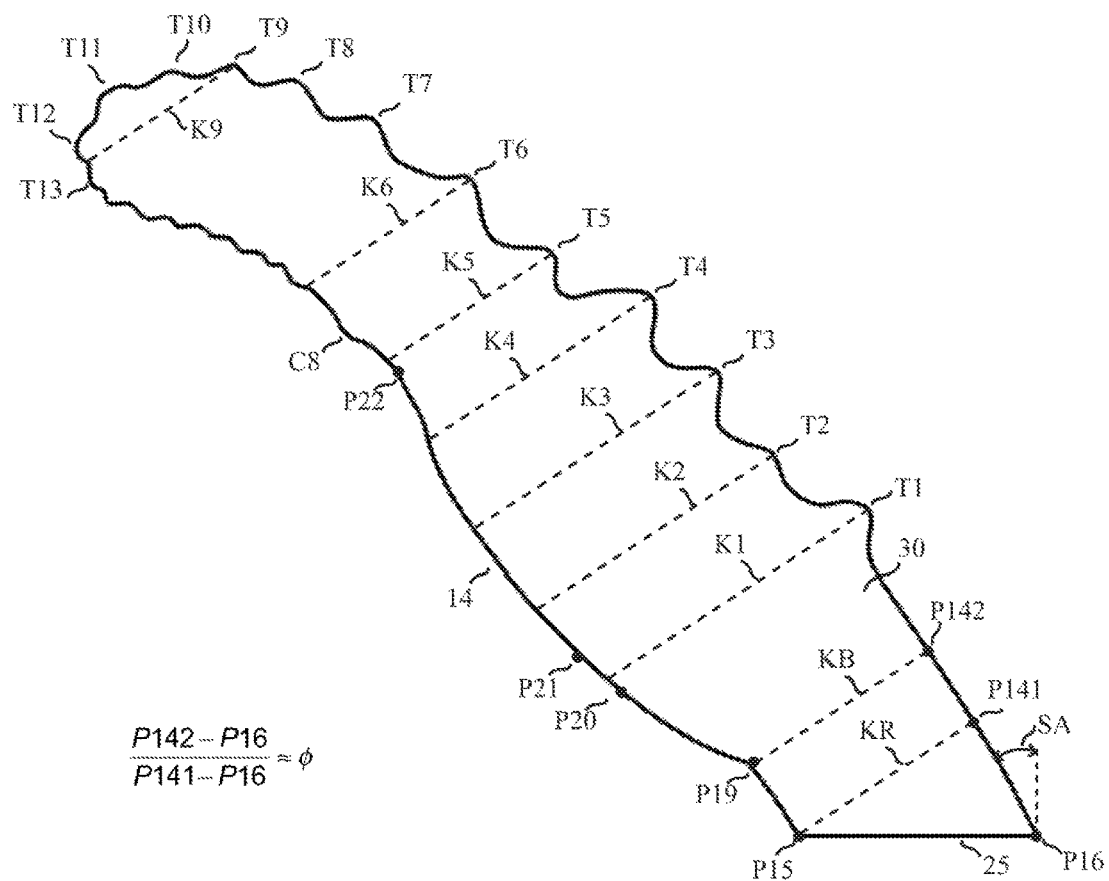
FIG. 14A is a top plan view of an airfoil which identifies line segments used for locating the airfoil cross sections found in Table 4.

Table 4) Relative thickness and location of max thickness for airfoil cross sections associated with FIG. 14A.

Table 5) Reynolds numbers and flow speeds associated with CFD results shown in FIGS. 17A-19C.

Figure 16A:
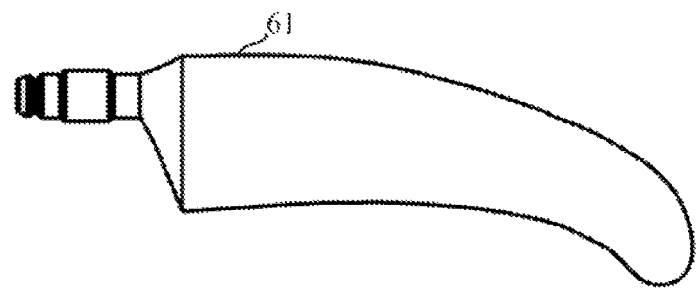
FIG. 16A is a top plan view of the Control airfoil shape 61 used in wind and water turbine tests reported herein.
Figure 16B:
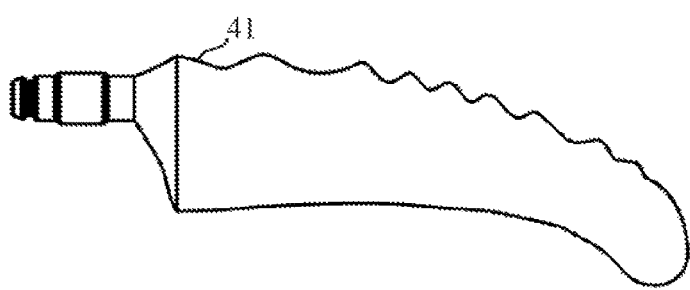
FIG. 16B is a top plan view of the Control+Tubercles airfoil shape 41 used in wind and water turbine tests reported herein.
Figure 16C:
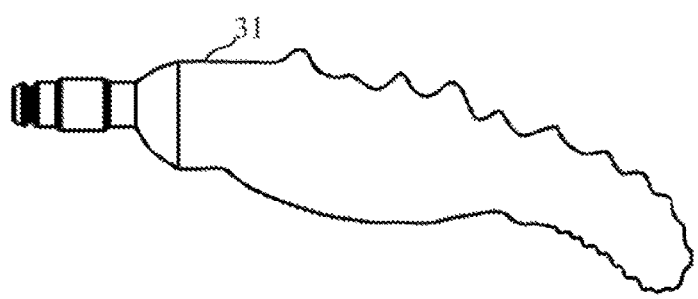
FIG. 16C is a top plan view of the Real Whale airfoil shape 31 used in wind and water turbine tests reported herein.

Table 6) Aspect ratios (AR) and volumes of airfoil shapes in FIGS. 16A-16C.

Table 7) Wind Turbine results comparing airfoil shapes in FIGS. 16A-16C.

Table 8) Tidal Turbine results comparing airfoil shapes in FIGS. 16A-16C. Test site: Kaneohe Bay, Hi., along leeward side of shallow reef. Smooth to slightly choppy conditions with no swell.

Table 9) Tidal Turbine results comparing airfoil shapes in FIGS. 16A-16C. Test site: open Pacific Ocean near Kaena Point, Hi. Slightly choppy conditions with up to 1 m swell.

DETAILED DESCRIPTION

Figure 1A:
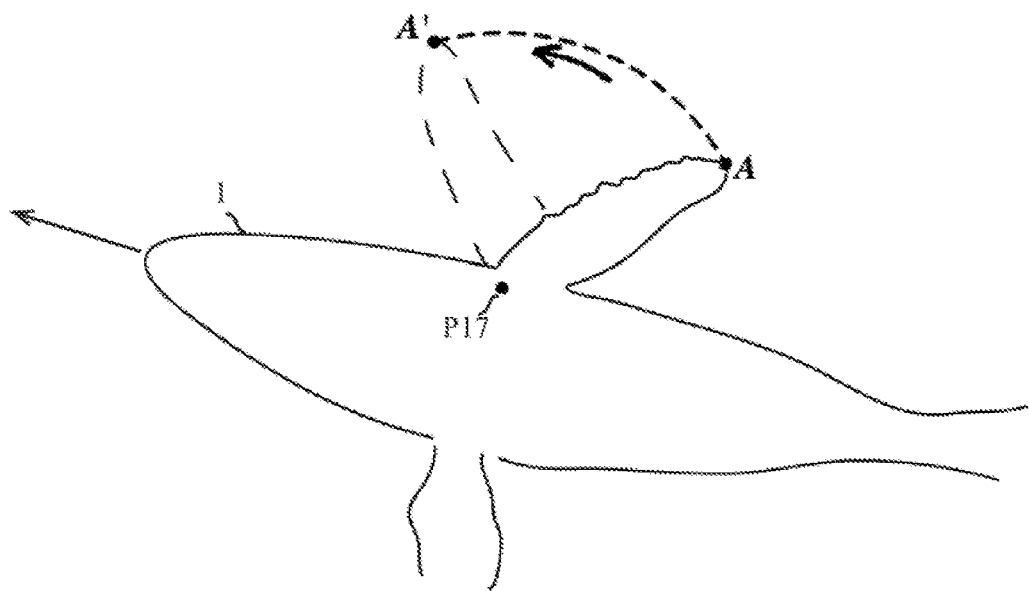
FIG. 1A is a sketch showing how the humpback whale uses its fins both as a wing and a rotor.
Figure 1B:
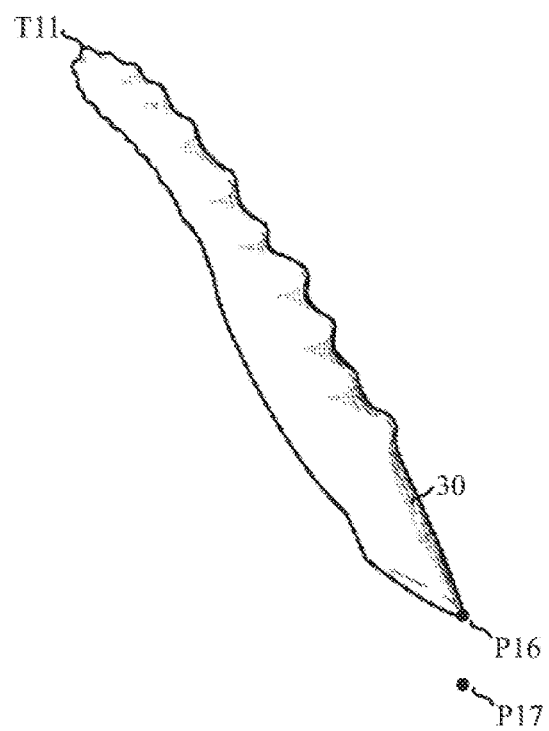
FIG. 1B is a perspective view of a pectoral fin of a humpback whale.

The humpback whale uses its pectoral fins in two primary ways: to generate lift and to maneuver. FIG. 1A shows how a humpback whale uses its pectoral fins (see FIG. 1B) like a rotor. The tip moves relative to the whale's shoulder joint P17, also referred to as the center of rotation, or pivot point. The fins generate massive amounts of lift as they rotate from A to A' during lunge feeding or similar maneuvers. With tip speeds calculated by the inventor approaching 20 mps (45 mph), it is apparent that the unique shape of the humpback's pectoral fin is of tantamount importance in maintaining control in a high Re, high turbulence environment. But the humpback also uses its pectoral fins like an oar to literally "grab" the water and initiate movement from a resting position. Indeed, humpback whales need their pectoral fins to perform optimally over a wide range of speeds and flow conditions.

Figure 2A:
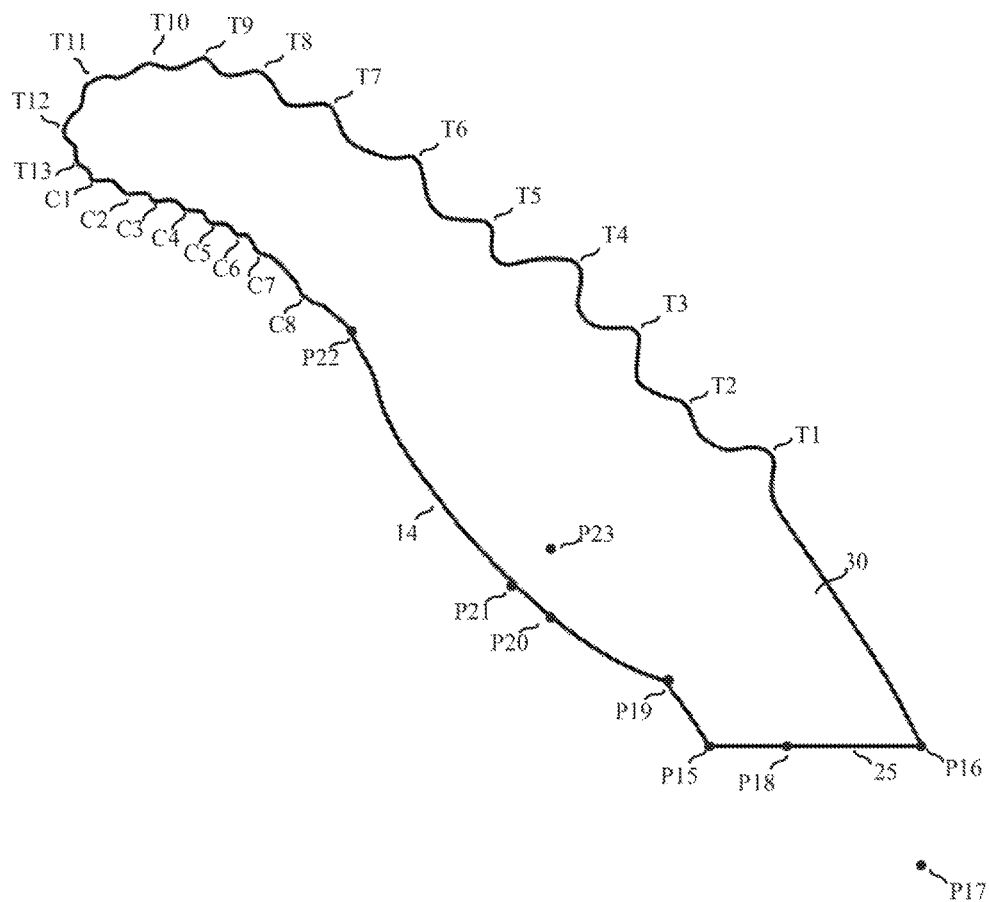
FIG. 2A is a top plan view (spanwise profile) of an airfoil body that shows locations of a pivot point, 13 tubercles, 8 crenulations, max chord trailing edge curvature and root chord and related points.
Figure 2B:
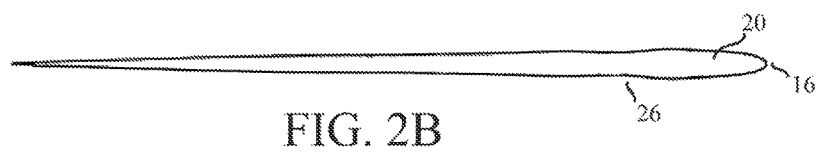
FIG. 2B is a side view of the airfoil body of FIG. 2A.

An exemplary airfoil shape according to the present disclosure is shown generally by reference numeral 30 in the drawings. It should be understood that the term airfoil is used herein for the sake of simplicity to refer to any manmade lifting, control, or other body designed to react or impart fluid dynamic forces, regardless of the type of fluid (e.g., whether air, water, or other fluid) and regardless of the manner of deployment (e.g., whether fixed wing, rotor, vane, or other application). FIGS. 2A and 2B highlight the passive flow control devices known to the inventor that appear on the humpback whale's pectoral fin as applied to airfoil 30. FIG. 2A is a spanwise profile of airfoil 30 that identifies 13 tubercles T1-T13, 8 crenulations C1-C8, max chord trailing edge curvature 14 and related points P19-P23, and root chord 25 and related points P15, P16 and P18. FIG. 2B is a side view of airfoil 30 revealing the nonlinear spanwise variation in chord thickness 20, with local minimum thicknesses at 16 and 26.

Figure 8:
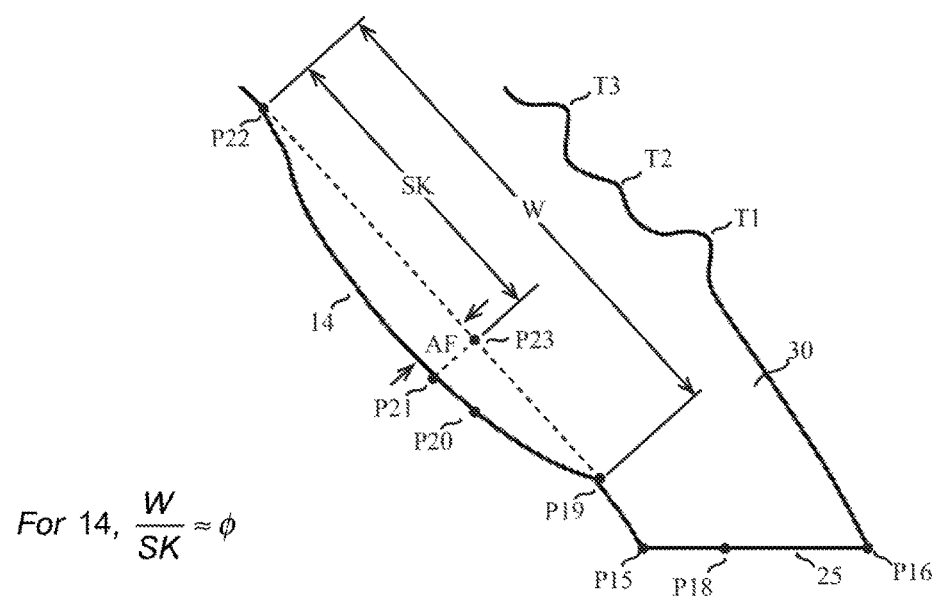
FIG. 8 is a top plan view of a portion of an airfoil which identifies points associated with the divine ratio used for locating the max chord trailing edge curvature.

The number of tubercles (13) and crenulations (8) identified by the inventor on the average humpback whale fin are both Fibonacci numbers. Of the 13 tubercles identified in FIG. 2A, 8 are considered primary tubercles and 5 are secondary. Note that both 8 and 5 are Fibonacci numbers.

Figure 3:
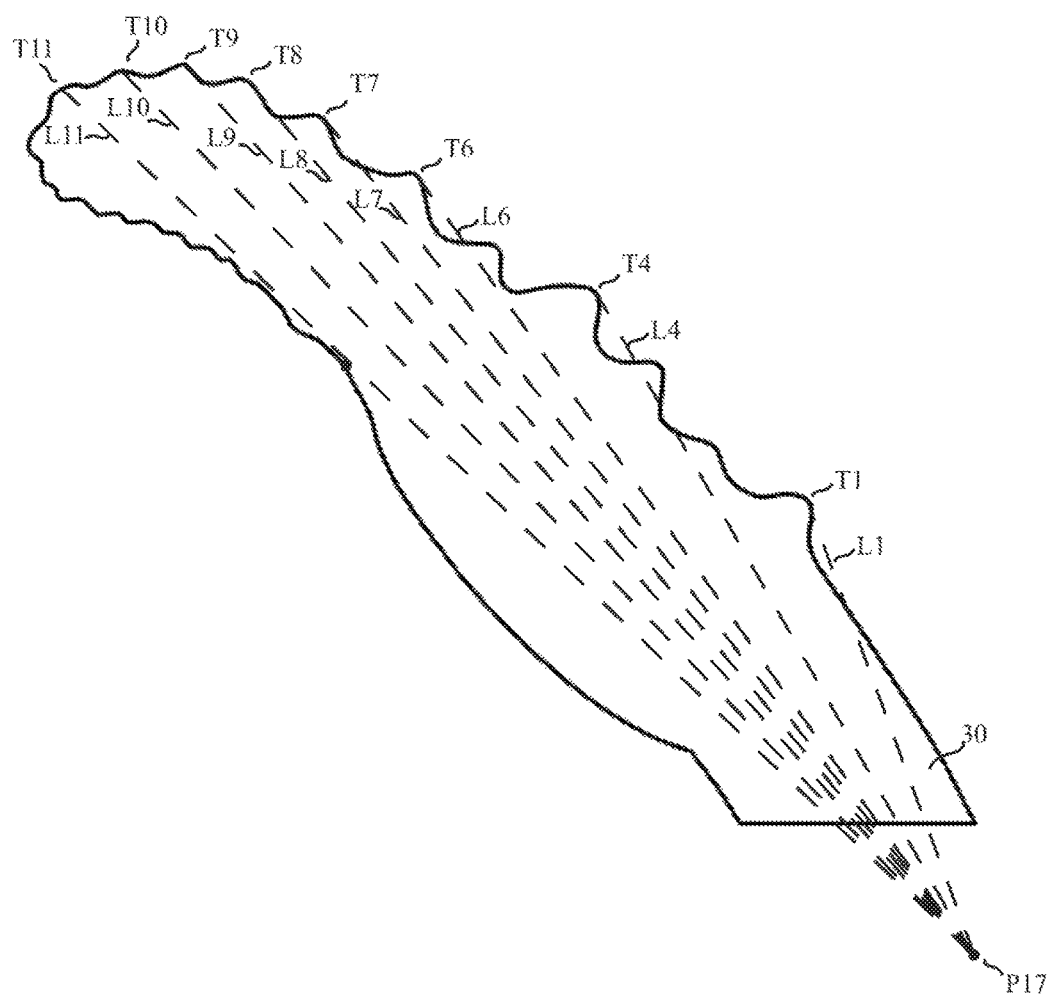
FIG. 3 is a top plan view of the airfoil body of FIG. 2A that includes line segments used to construct Fibonacci sequence ratios of the 8 primary tubercles relative to the pivot point.

FIG. 3 identifies line segments L1-L11 used to construct divine ratios useful for positioning the 8 primary tubercles relative to the pivot point P17. After making a basic sketch of the spanwise profile for a desired airfoil shape with a straight leading edge (see, for example, FIG. 21), the designer may then place point P16 at the leading edge root base, and another point P17 directly beneath it that represents the pivot point. A line segment drawn between P16 and P17 should be perpendicular or nearly perpendicular to root chord 25. On a humpback whale, P17 represents the location of the shoulder socket, but for an airfoil point P17 might represent the center of the hub on a propeller, the center of a fuselage on an aircraft, or the ball of a surfer's foot on a surfboard, for example. From P17, another point is located at the wingtip that represents the maximum spanwise distance from P17, which is the location of tubercle T11.

After T11 is mapped and L11 is measured, the remaining tubercles may be located within a specified tolerance (e.g., within about ±0.05) of the Fibonacci ratios shown in Table 1, with possible exceptions at T1(±0.02) and T11(±0.0), for example. The Fibonacci ratios may be generated from the Fibonacci sequence of 0, 1, 1, 2, 3, 5, 8, 13, 21, for example. So, for instance, to locate T1, the ratio of L1/L11 may be between about 0.36 and about 0.40. Drawing software such as Geometer's Sketchpad™ software, available from McGraw-Hill Education (dynamicgeometry.com, New York, N.Y.), may be useful for creating line segments and formulas for the proportions, where the proportions may adjust every time the designer adjusts the length and position of a line segment.

TABLE 1

| Tubercle # | T1 | T4 | T6 | T7 | T8 | T9 | T10 | T11 |
|---|---|---|---|---|---|---|---|---|
| Fibonacci ratio | (21 − 13)/21 = .38 | (21 − 8)/21 = .62 | (21 − 5)/21 = .76 | (21 − 3)/21 = .86 | (21 − 2)/21 = .9 | (21 − 1)/21 = .95 | (21 − 1)/21 = .95 | (21 − 0)/21 = 1.0 |

Figure 4:
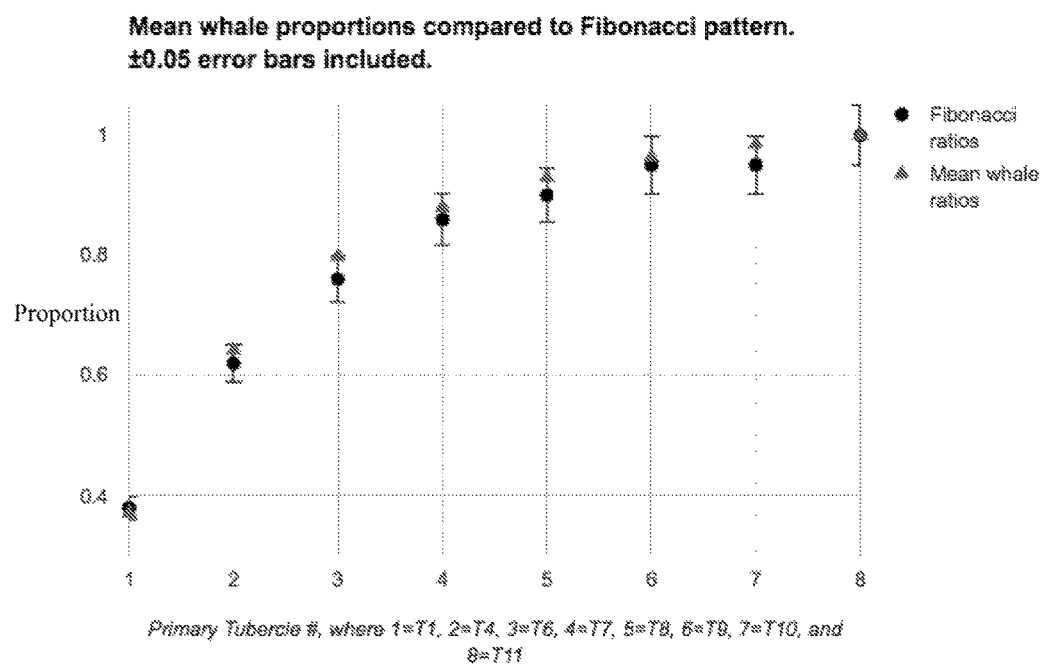
FIG. 4 is a graph of actual Fibonacci sequence ratios for primary tubercles compared to average ratios for primary tubercles of 6 whale fins, with ±0.05 error bars included.

FIG. 4 is a graph of mean whale proportions compared to their associated Fibonacci ratios for the 8 primary tubercles. The whale proportions are means from 6 whales, including 4 adults, 1 baby, and 1 fetus. ±0.05 error bars are included to show how the whale proportions closely match the Fibonacci ratios from Table 1 for a variety of whale sizes and ages. Table 1 also provides good evidence of the remarkable attribute of self-similarity associated with natural shapes containing the divine proportion and related patterns, with unborn whales to adults embodying these proportions.

Figure 5A:
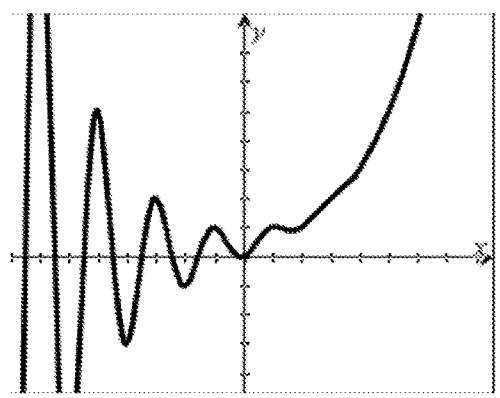
FIGS. 5A and 5B are graphs of Fibonacci functions used as templates for drawing tubercles and crenulations and their relative amplitudes, wavelengths and skews.
Figure 5B:
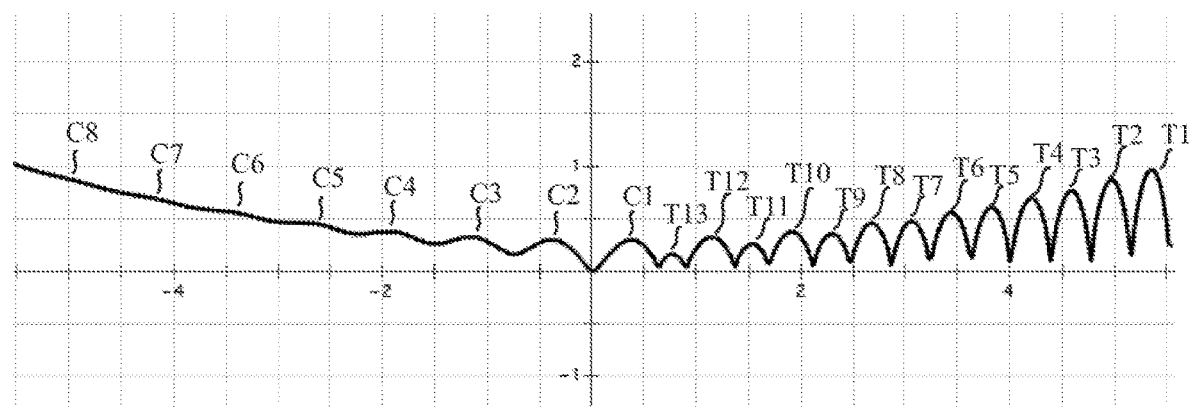

After locating the 8 primary tubercles, the designer may continue locating and shaping the passive flow control devices shown in FIG. 2A. In some embodiments, divine spirals S1-S4 (see, e.g., FIGS. 6, 7, 11, 12, and 13) and/or the Fibonacci function are two main tools the designer may use to do so. FIG. 5A displays the symbolic and graphical form of the standard Fibonacci function $F_x$. FIG. 5B displays the symbolic and graphical form of the inventor's modified Fibonacci function, $FM_x$, which more clearly reveals how it can assist in shaping the relative size and skew of each protuberance. The non-periodic nature of the function will be apparent to the artisan skilled in trigonometry and analytical geometry. The artisan may also notice that the peaks in FIG. 5B are skewed to the right or left of center. For example, it is evident that peak C1 is skewed to the right of the vertical axis.

Figure 6:
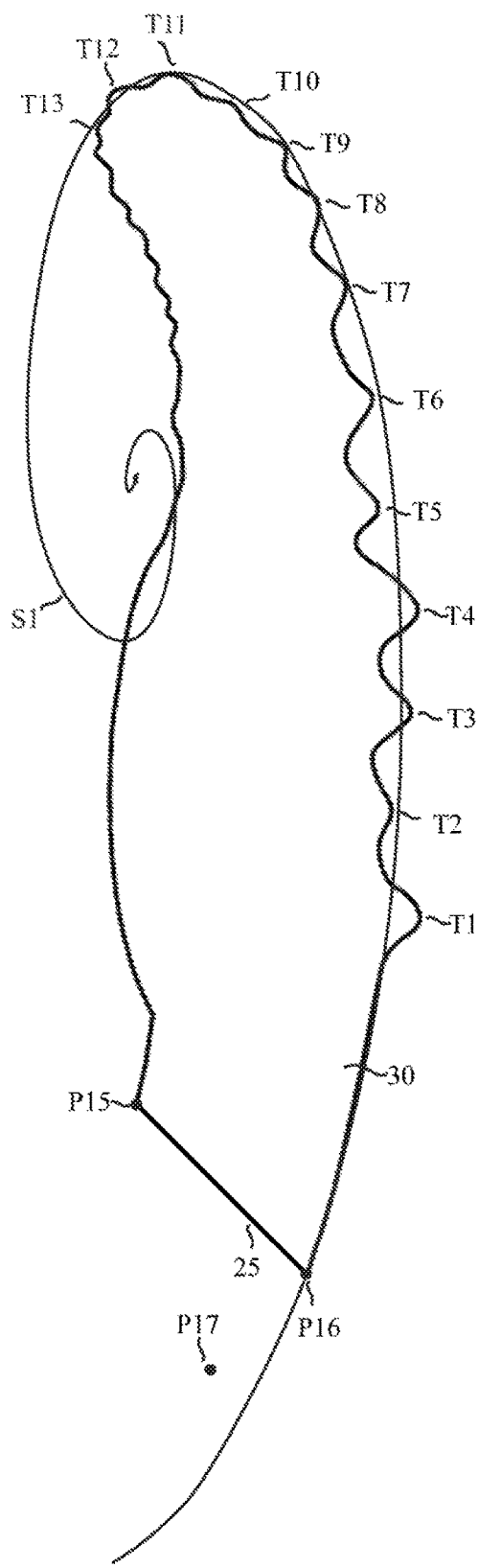
FIG. 6 is a top plan view of an airfoil illustrating the use of a divine spiral to configure a curve for the leading edge of the airfoil.

At some point the designer may need to adjust the leading edge of the original spanwise profile to more closely match the humpback whale's curvature, with or without leading edge tubercles. This may be done by sketching a divine spiral S1 like the one shown in FIG. 6, for example. Software programs like PhiMatrix™ may be useful for constructing divine spirals (see description above). Important construction points may include passing through points P16 and T11, which may be the outermost point of the divine spiral. In some embodiments, the leading edge curve, whether generated using a divine spiral or not (as in FIG. 21, for example), may be positioned as shown in FIG. 6 so that T1, T3 and T4 are positioned outside (ahead of) the leading edge curve S1, and T2 and T5 may be on the inside (aft of) the leading edge curve S1. Of course, other suitable arrangements for the leading edge curve may be utilized as well.

Figure 7:
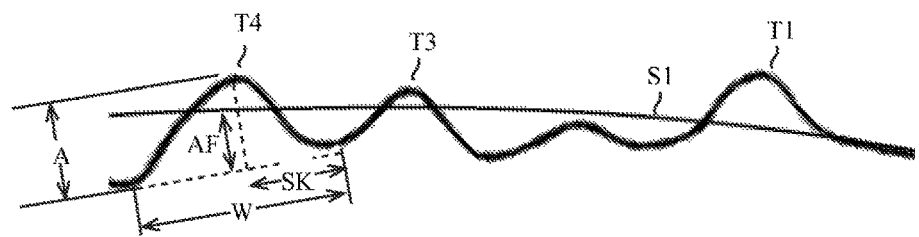
FIG. 7 is a top plan view of a portion of a leading edge of an airfoil illustrating an example for placing protuberances using the wavelengths, amplitudes and skews found in Tables 2 and 3.

FIG. 7 illustrates how each tubercle T1-T13, crenulation C1-C8, and max trailing edge curvature 14 may be associated with specific proportions for their amplitude (A and AF), wavelength W, and skew SK. A is the true amplitude of a protuberance, while AF is the amplitude relative to a phi spiral generated along the leading edge (or trailing edge as in FIGS. 11-13), or generated relative to the designer's original spanwise profile. A and AF may be perpendicular to W. Of course, other measurements or criteria may be employed to define the locations and shapes of the tubercles and crenulations.

Table 2 lists exemplary proportions that may be used to generate the amplitude, wavelength and skew as described in FIG. 7 for tubercles T1-T13.

TABLE 2

|  | T1 | T2 | T3 | T4 | T5 | T6 | T7 | T8 | T9 | T10 | T11 | T12 | T13 |
|---|---|---|---|---|---|---|---|---|---|---|---|---|---|
| SK/W | .45 | .45 | .45 | .45 | .38 | .45 | .45 | .45 | .45 | .5 | .45 | .62 | .62 |
| AF/W | .12 | .26 | .22 | .19 | .38 | .30 | .34 | .30 | .38 | .33 | .45 | .45 | .33 |
| A/AF | 3.24 | .62 | 1.62 | 2.24 | .5 | 1 | 1 | 1 | 1 | 1 | 1 | 1 | 1 |

Table 3 lists exemplary proportions that may be used to generate the amplitude, wavelength and skew as described in FIG. 7 for crenulations C1-C8, plus the max chord trailing edge curvature 14.

TABLE 3

|  | C1 | C2 | C3 | C4 | C5 | C6 | C7 | C8 | Max chord t.e. curvature (14) |
|---|---|---|---|---|---|---|---|---|---|
| SK/W | .38 | .5 | .38 | .45 | .38 | .5 | .38 | .38 | .62 |
| AF/W | .33 | .22 | .19 | .2 | .23 | .16 | .09 | .01 | .11 |
| A/AF | 1 | 1 | 1 | 1 | 1 | 1 | 1 | 1 | 1 |

Values used for the proportions in Tables 2 and 3 resulted from the inventor's comparisons of actual whale proportions together with proportions generated from function $FM_x$ in FIG. 5B. Many of the proportions are closely associated with Fibonacci ratios, such as 0.38, 0.62, and 0.45, the rounded form of 1 over the square root of 5 that appears in $F_x$ and $FM_x$. For this embodiment, note that SK is always positioned on the side of the wavelength W closest to the previous protuberance. For example, reading Tables 2 and 3 from left to right, T1 is considered the first protuberance, followed by T2, T3 etc. Notice in FIG. 7 how the skew for T4 is closest to T3, which means T3's skew is drawn closer to T2, T2's skew is drawn on the side closer to T1, and T1's skew is drawn on the side closer to P16. The pattern described above may be followed for positioning the skew SK all the way around the airfoil until the max chord trailing edge curvature 14 is completed. Designers skilled in the art of CAD may use spline or similar functions to shape each protrusion and complete the spanwise profile.

Figure 9:
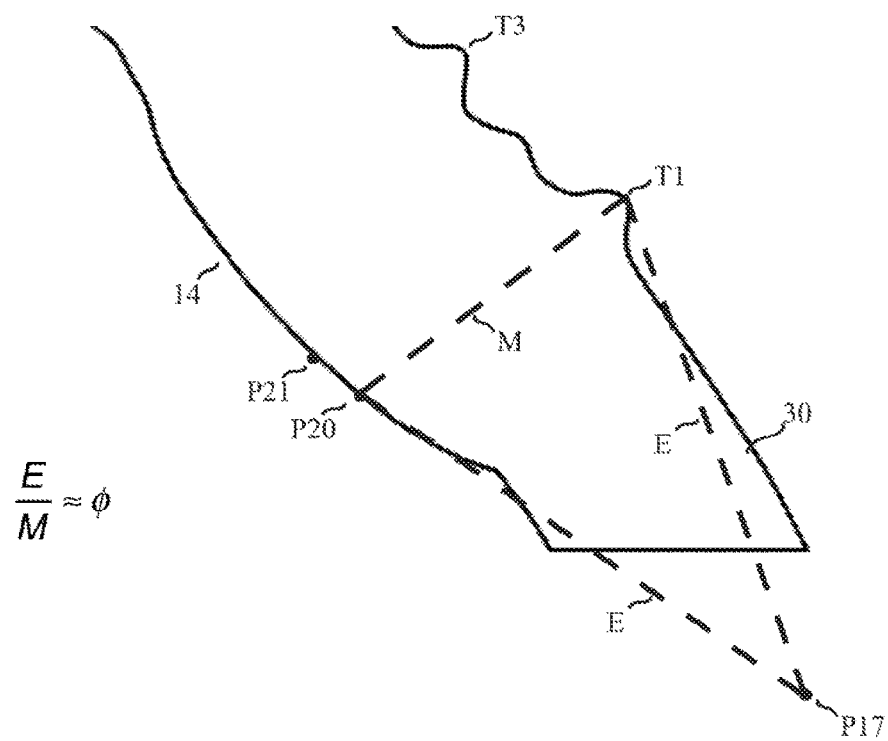
FIG. 9 is a top plan view of a portion of an airfoil which identifies the location of a divine triangle used for locating the max chord trailing edge curvature.

FIGS. 8 and 9 are for designing the max chord trailing edge curvature 14. Note that a special property of the divine proportion, ϕ, is that its rounded form equals 1.618, while its reciprocal, 1/ϕ, equals 0.618. So, in Table 3, SK/W equals 1/ϕ for the max chord trailing edge curvature 14, while W/SK=ϕ as shown on FIG. 8. The divine proportion may be used to locate P23, the intersection of W and AF, as well as P21, the point where the curve of 14 reaches a maximum chord. To better locate this maximum, a Fibonacci triangle may be drawn relative to the pivot point P17 as shown in FIG. 9. A Fibonacci triangle is an isosceles triangle where the two longest sides (E) are congruent, and the ratio of a longer side E to the shorter side M equals ϕ. Depending on the designer's final shape, P20 and P21 may be close to each other, or possibly even the same point.

Figure 10:
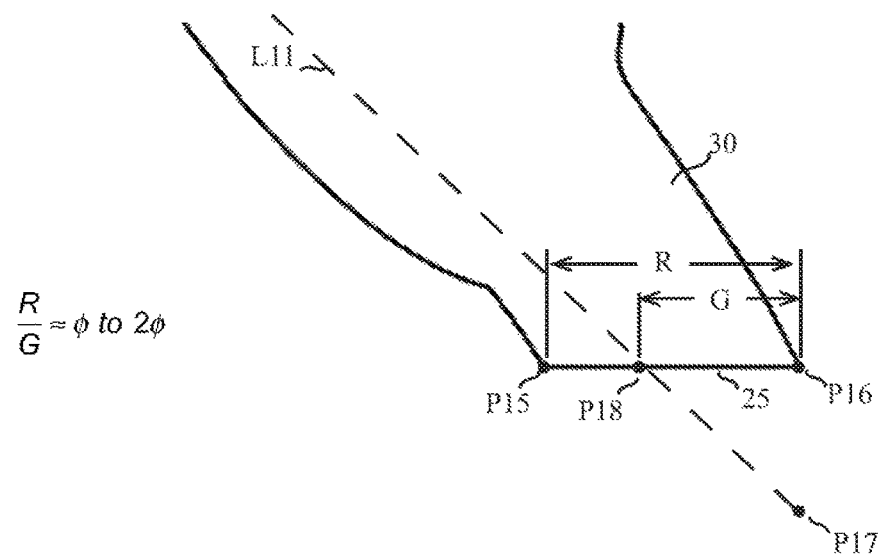
FIG. 10 is a top plan view of a portion of an airfoil which identifies the divine ratio associated with the root chord.
Figure 11:
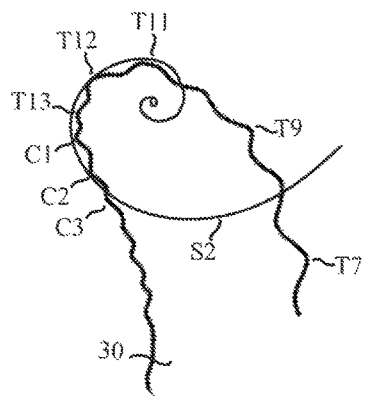
FIG. 11 is a top plan view of a portion of an airfoil which illustrates the use of a divine spiral to configure a curve for the tip trailing edge.
Figure 12:
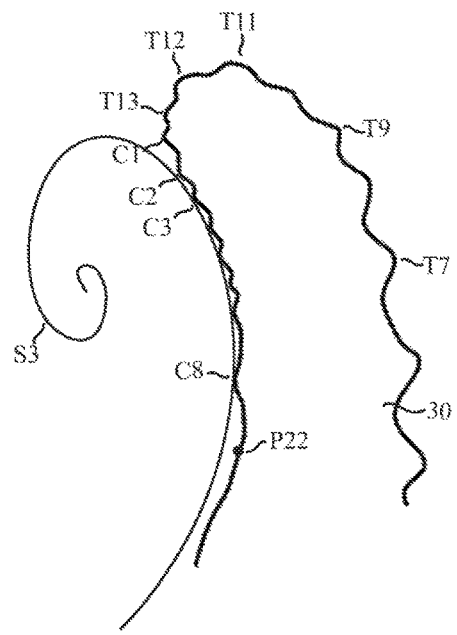
FIG. 12 is a top plan view of a portion of an airfoil which illustrates the use of a divine spiral to configure a curve for the trailing edge between the tip and the max chord trailing edge curvature.

As the designer completes the spanwise profile, FIG. 10 may be used to determine the length of root chord 25. Point P18 marks the intersection of L11 and root chord 25, which creates a ratio along root chord 25 of R/G between about ϕ and about 2ϕ, as shown in FIG. 10.

Figure 13:
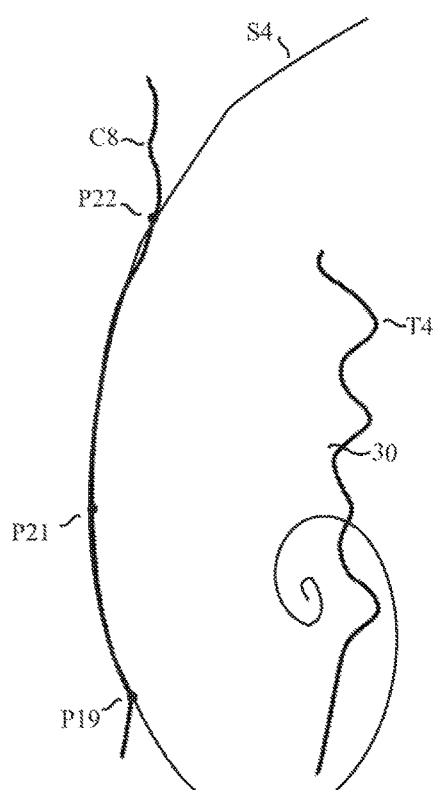
FIG. 13 is a top plan view of a portion of an airfoil which illustrates the use of a divine spiral to configure a curve for the max chord trailing edge curvature.

As stated earlier, divine spirals may be used as needed to assist in shaping the tip of the trailing edge from T11 to C1 (see FIG. 11), the curvature between C2 and C8 (see FIG. 12), and the curvature of 14 between P22 and P19 (see FIG. 13). Note also how the curvature change between C1 and C2 is also a major transition point on the Fibonacci function $FM_x$ shown in FIG. 5B. In some embodiments, for all trailing edge protrusions, the divine spirals S2, S3 and S4 may help the designer position the amplitude so that A/AF=1, as shown in Tables 2 and 3.

Figure 14B:
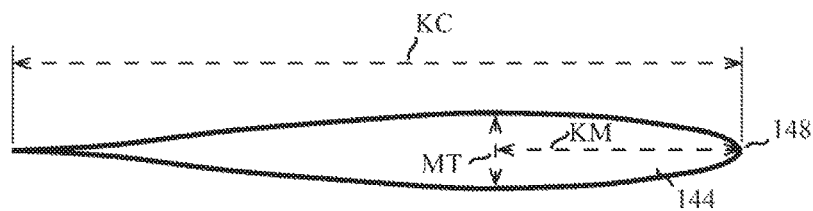
FIG. 14B is a standard airfoil cross section.

FIG. 14A identifies line segments 25-K9, which are chord positions used for constructing airfoil cross sections and their associated proportions shown in Table 4. Each of line segments 25-K9 may be associated with a particular point on the airfoil's leading edge, whose placement is described herein. Specifically, in some embodiments, leading edge points associated with tubercles T1-T9 may respectively identify chord positions K1-K9, point P142 may identify chord position KB, point P141 may identify chord position KR, and point P16 may identify chord position 25. In some embodiments, with the exception of the root chord 25, all chord lengths may be drawn parallel to chord KR. FIG. 14B illustrates the shape of a typical, uncambered, airfoil cross section 144 of chord length KC, the max thickness MT, and the distance KM of the max thickness from the leading edge 148. The location of MT is described in Table 4 as a percentage of the total chord length KC, relative to the leading edge 148. Artisans skilled in the art will understand this percentage as the ratio KM/KC.

TABLE 4

| Max Thickness Proportions | FIG. 14A Chord Location | | | | | | | | | |
| --- | --- | --- | --- | --- | --- | --- | --- | --- | --- | --- |
| | 25 | KR | KB | K1 | K2 | K3 | K4 | K5 | K6 | K9 |
| Max thickness [MT] in proportion to root chord [25] max thickness | 1 | 1.2 | .95 | 1 | .84 | .79 | .71 | .70 | .62 | .21 |
| Location of max thickness [MT] (% from leading edge) | 31 | 32 | 32 | 38 | 26 | 30 | 38 | 37 | 43 | 50 |

Although Fish et al. (1995) concluded that cross sections of a humpback whale's pectoral fin most closely modeled NACA 63-012 to NACA 63-021 series airfoils, further evaluation by the inventor revealed this wasn't always the case. While the inventor believes the most important component of airfoil cross sections are the proportions shown in Table 4 for some embodiments, artisans may be interested in the airfoil sections selected by the inventor for CFD testing of airfoil 30. At the root, the max thickness tends to be closer to the leading edge, which is why NACA 00xx series airfoils were chosen for chords 25, KR, KB, K2 and K3. For chords K1 and K4, which are also identified with the two largest tubercles, the NACA 63 series was the best fit, although the inventor adjusted the location of maximum thickness to 38% of chord length (a Fibonacci ratio, see Table 1), compared to 35% for a normal NACA 63 series airfoil and the 40% described by Fish et. al. (1995) for the humpback whale flipper. A NACA 63 series was also used at chord K5. Towards the tip, the location of max chord thickness is even farther from the leading edge on an actual whale, which is why NACA 66 series airfoils were used at K6 and K9.

Because everything in airfoil 30 may be defined relative to the pivot point P17, the designer may construct one shape, and then adjust its sweep angle SA, identified in FIG. 14A. The differences with respect to sweep angle may then be tested using CFD or similar flow testing until the desired performance is achieved. However, as SA is adjusted, it may become important to ensure that chord KR is placed correctly. As the ratio in FIG. 14A shows, measuring the distance between P142 and P16, and between P141 and P16, and then dividing should yield a ratio close to $\phi$.

Figure 20A:
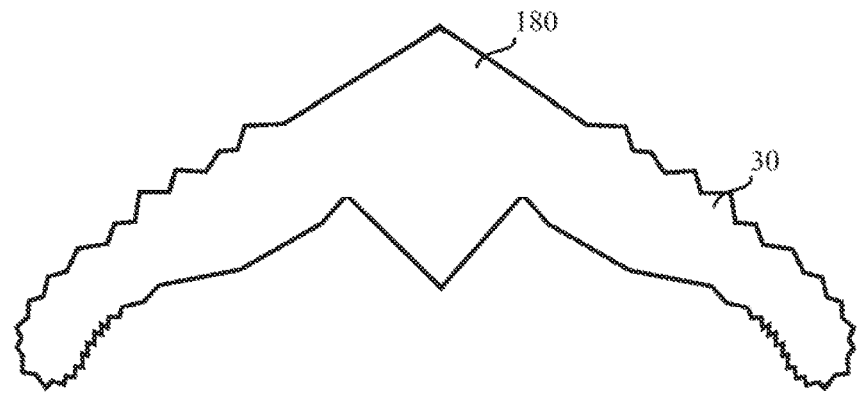
FIG. 20A is a top plan view of an unmanned aerial vehicle (UAV) having wings configured with tubercles, crenulations and other features as described herein.
Figure 20B:
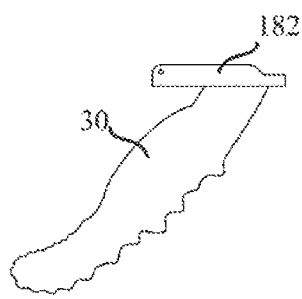
FIG. 20B is a side view of a surfing fin configured with tubercles, crenulations and other features as described herein.
Figure 20C:
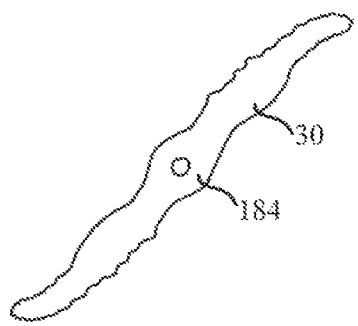
FIG. 20C is a front view of a propeller configured with tubercles, crenulations and other features as described herein.
Figure 20D:
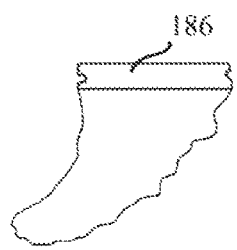
FIG. 20D is a side view of a high performance surfing fin configured with tubercles, crenulations and other features as described herein.

For airfoil shapes with aspect ratios around 3 or less, the designer may wish to utilize some, but perhaps not all, of the embodiments described herein. For example, on a lower aspect ratio shape such as a high-performance surfing fin 186 (FIG. 20D), it may not be feasible to attempt to include all the tubercles and crenulations described herein. For example, for fin 186, only 11 of 13 tubercles and 5 of 8 crenulations were used, and the max trailing edge chord was at the root instead of near P20 and P21. Also, some of the design aspects may begin to break down for some low aspect ratio airfoils. For example, in some embodiments, locating P20 using a Fibonacci triangle per FIG. 9, or locating KB and KR per FIG. 14A, may not be feasible. In such instances, the inventor suggests the following modifications: (1) omit airfoil cross-section KB, (2) use the Fibonacci Triangle plus the ratio R/G in FIG. 10 to help locate KR, (3) create all chords parallel to the base, (4) attempt to make the tops of all tubercles parallel to the base to encourage channeling of flow and vortex generation parallel to the base, and (5) place point P22 in line with tubercle T4. Of course, other variations may also be useful, depending on the particular application.

Figure 15A:
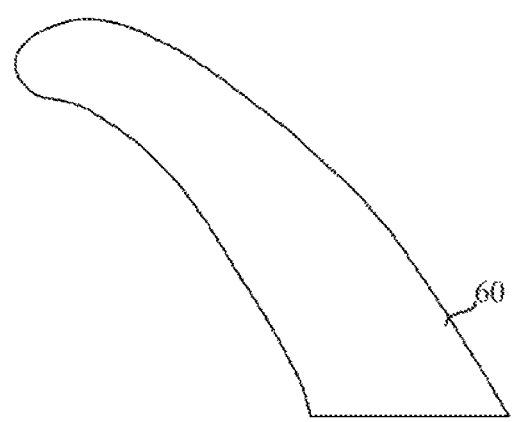
FIG. 15A is a top plan view of the Control 60 airfoil shape used in CFD tests reported herein.
Figure 15B:
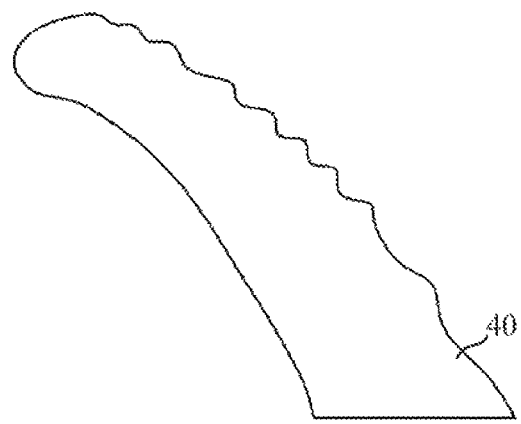
FIG. 15B is a top plan view of the Control+Tubercles 40 airfoil shape used in CFD tests reported herein.
Figure 15C:
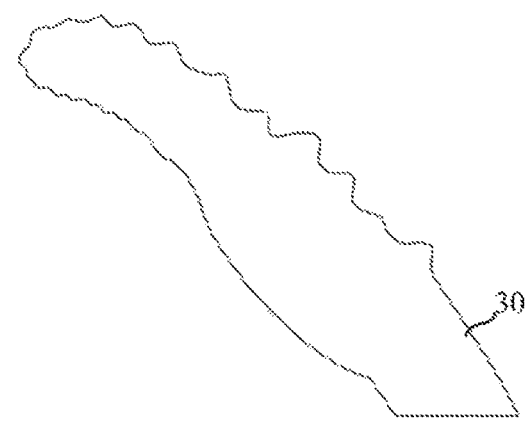
FIG. 15C is a top plan view of the Real Whale 30 airfoil shape used in CFD tests reported herein.

To CFD test the passive flow control devices of airfoil 30 described above, the OnShape™ CAD program available from onshape.com (OnShape, Inc., Cambridge, Mass.) was used to construct the three semi-span test shapes shown in FIGS. 15A-15C. The sweep angle SA (see FIG. 14A) chosen was about 34°, an angle considered as a Fibonacci angle (34°/90°=0.38). Also, underwater photos and videos captured by the present inventor show that humpback whales will cruise with their fins positioned at about a 34° sweep angle, suggesting this might be an optimum position for the whale. The Control 60 airfoil (FIG. 15A) followed an idealized spanwise profile of a humpback whale's pectoral fin with a straight leading edge. Divine spirals S1-S4 (see FIGS. 6, 11, 12, 13) were utilized in design and construction of Control 60 airfoil. However, none of the tubercles or crenulations described herein were included on the Control 60 airfoil. The chord thickness of Control 60 airfoil was not varied per Table 4. Instead, it tapered in a linear fashion out to the wingtip. A NACA 63 series cross section was placed at chord locations 25-K9.

For the Control+Tubercles 40 airfoil shown in FIG. 15B, only the leading edge of the Control 60 airfoil shape was adjusted to include 8 tubercles at locations T1-T8. Tubercle shape was based on research by Shi et al. (2015), where they tested several different amplitude/wavelength combinations, and concluded their best-performing sinusoid pattern occurred when amplitude (A)=0.1C and wavelength, W=0.5C (C=chord length). No skew SK was involved in their pattern. A NACA 63 series cross section was placed at chord locations 25-K9.

The third test shape shown in FIG. 15C was the Real Whale 30 airfoil described herein. For all test shapes, OnShape's loft function was used to generate volume between airfoil cross sections. A cloud-based CFD program utilizing OpenFOAM CFD software (conself.com, Milan, Italy) was used to create high resolution (2-3 million cells) meshes and perform CFD tests at the low and high Reynolds numbers shown in Table 5. Tests were performed in 5° increments for angles of attack from 0° to 30°. Paraview™ software (Kitware Inc., Clifton Park, N.Y.) was used to calculate lift and drag coefficients. The main reason CFD tests were run at equal Re instead of equal speeds was to account for differences in scale. All models originally had semi-span lengths of 254 mm. The Real Whale 30 airfoil model was 3D-printed, and in order to fit within the maximum printer dimensions, its span was reduced to 226 mm. Finally, all tests were conducted using a no-slip root wall, in order to provide a more realistic condition, where the root of the airfoil would experience interference effects from, for example, the fuselage of an aircraft.

Results are shown in FIGS. 17A-19C, where C=Control 60, CT=Control+Tubercles 40, and RW=Real Whale 30. At low Re (FIGS. 17A-17D), all models had a similar stall angle (angle of attack where peak lift coefficient occurs, see FIG. 17A) around 25°. Swept wings often have higher stall angles than wings with no or small sweep angles. The maximum lift coefficients were not significantly different. For angles of attack greater than 5°, the Real Whale 30 model had a lower drag coefficient (FIG. 17B) compared to the Control 60 model and Control+Tubercles 40 model, with a maximum decrease of 18% compared to the Control 60 model. The peak lift:drag ratio (FIG. 17C) occurred at about 5° for all designs, with the Real Whale 30 model having 14% & 11% decreases compared to the Control 60 model and Control+Tubercles 40 model, respectively. The reduction in peak lift:drag ratio is a pattern similar to other research where tubercled vs straight leading edges were compared (see Aftab et al 2016 below). However, above 5° aoa, the Real Whale 30 pattern was consistently the most efficient design. The improved lift/drag and also reduced drag over more than 80% of the angles of attack tested would benefit any device requiring high maneuverability, for example, or one that operates in a highly turbulent environment, where flows are approaching the airfoil from a variety of angles and speeds. For a large animal to be so maneuverable, it must expend a great deal of energy overcoming inertia, making the need for a highly efficient fin mandatory. Interestingly, the Real Whale 30 model had its largest improvement in lift to drag ratio (+9.5%) over the other designs at 25° angle of attack, the point of maximum lift.

Figure 17A:
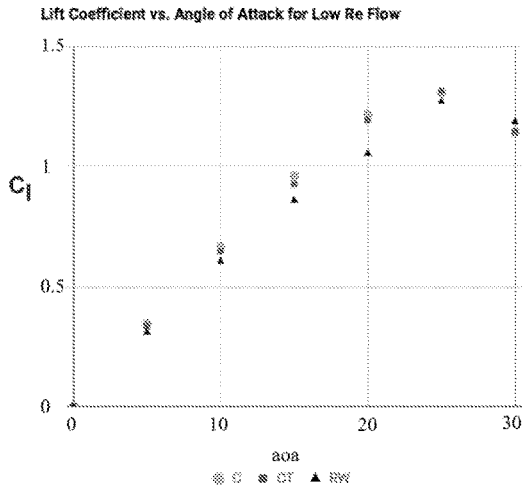
FIG. 17A is a graph of low Re CFD results comparing lift coefficients vs. angle of attack for the airfoil shapes in FIGS. 15A-15C.
Figure 17B:
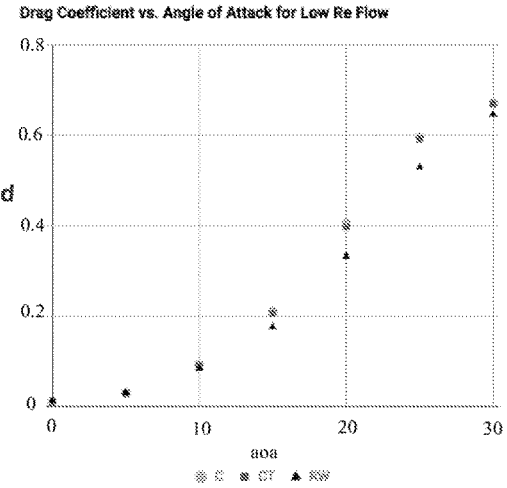
FIG. 17B is a graph of low Re CFD results comparing drag coefficients vs. angle of attack for the airfoil shapes in FIGS. 15A-15C.
Figure 17C:
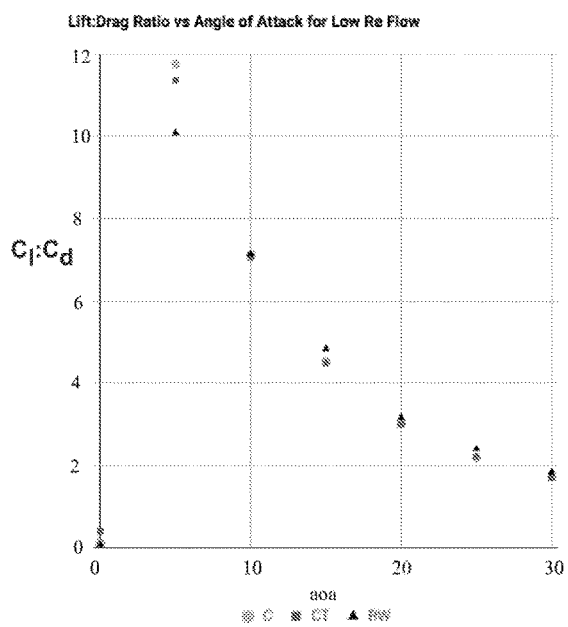
FIG. 17C is a graph of low Re CFD results comparing lift:drag ratios vs. angle of attack for the airfoil shapes in FIGS. 15A-15C.
Figure 17D:
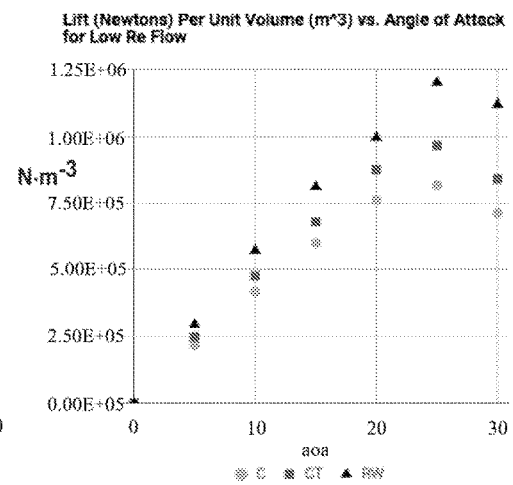
FIG. 17D is a graph of low Re CFD results comparing lift per unit volume for the airfoil shapes in FIGS. 15A-15C.
Figure 18A:
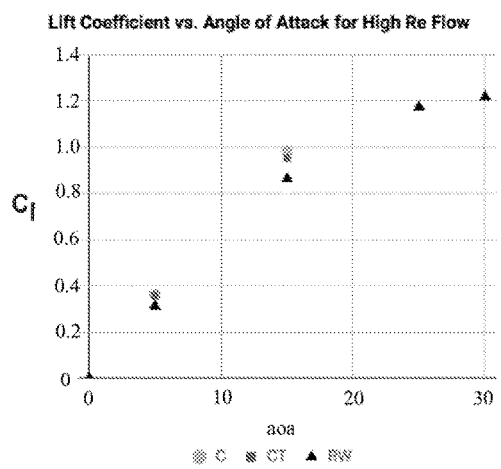
FIG. 18A is a graph of high Re CFD results comparing lift coefficients vs. angle of attack for the airfoil shapes in FIGS. 15A-15C.
Figure 18B:
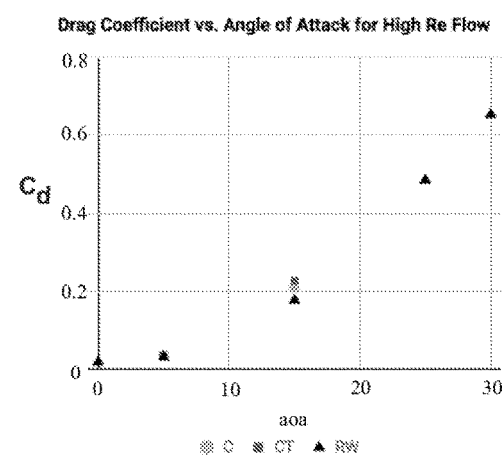
FIG. 18B is a graph of high Re CFD results comparing drag coefficients vs. angle of attack for the airfoil shapes in FIGS. 15A-15C.
Figure 18C:
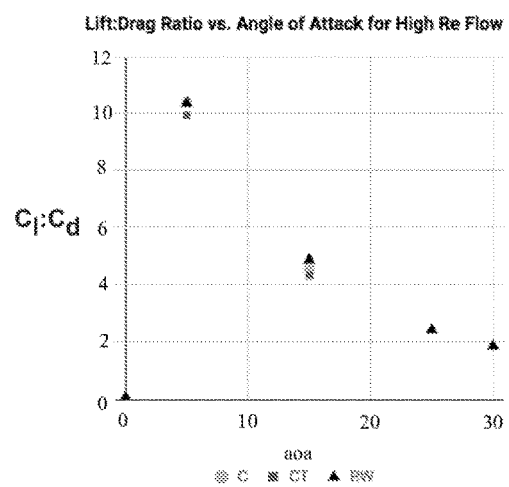
FIG. 18C is a graph of high Re CFD results comparing lift:drag ratios vs. angle of attack for the airfoil shapes in FIGS. 15A-15C.
Figure 18D:
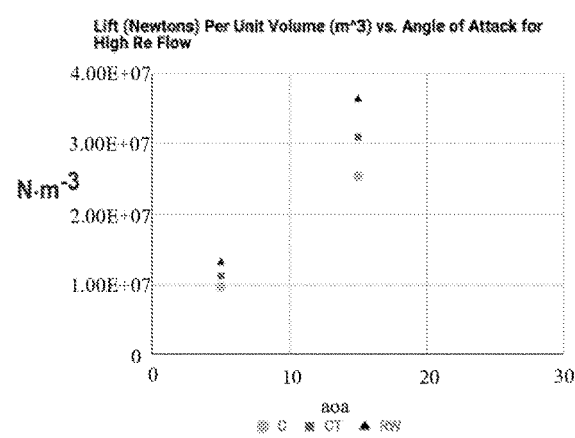
FIG. 18D is a graph of high Re CFD results comparing lift per unit volume for the airfoil shapes in FIGS. 15A-15C.

While the Real Whale 30 model and the Control+Tubercles 40 model had reduced lift coefficients, one significant advantage is seen when comparing lift per unit volume of wing tested (FIGS. 17D, 18D). For the equal flow conditions tested (meaning equal Re), both the Real Whale 30 model and the Control+Tubercles 40 model had much higher values of lift per unit volume, up to 57% greater than the Control 60 model. In essence, the Real Whale 30 model can produce the same amount of lift using less material. So, at low Re and 5° aoa, when lift:drag is optimized, the Real Whale 30 model's lift:drag is 14.3% lower than the Control 60 model, but its lift per unit volume is 35% greater than the Control 60 model (and 18.4% greater than the CT 40 model). At high Re and 5° aoa, the Real Whale 30 model's lift:drag is almost identical to the Control 60 model (and 4.1% better than the CT 40 model), with a 35.9% increase in lift per unit volume over the Control 60 model (and 17.1% greater than the CT 40 model). The weight savings resulting from the reduced volume helps compensate for the reduced lift. Other benefits include reduced fuel consumption and lower material costs. A wing with lower volume would also have a lower moment of inertia, making it more maneuverable and quicker to respond because less torque is required to initiate movement, as the turbine tests described later revealed.

At high Re (FIGS. 18A-18D), although less data was collected due to computing costs, it is apparent that for the Real Whale 30 model, high and low Re followed similar lift patterns, with the exception being the high Re simulation did not stall over the range of angles of attack tested (00-30°) (see FIGS. 17A, 18A). At the high sweep angles tested (see FIGS. 15A-15C), it appears the delayed stall benefits of tubercles may only occur for higher-speed flows. Comparisons of mean percent increases at 5° and 15° aoa reveal some significantly different trends to low Re comparisons in FIG. 17A-17D. At high Re, the decrease in lift was not significantly more (−12.2% for high Re compared to −9.1% for low Re), while the decrease in drag was significantly less (−16.9% for high Re compared to −5.5% for low Re) and the lift:drag ratio was significantly higher (+5.9% for high Re compared to −2.8% for low Re), suggesting that the Real Whale 30 model performs better at high speeds than low speeds.

Figure 19A:
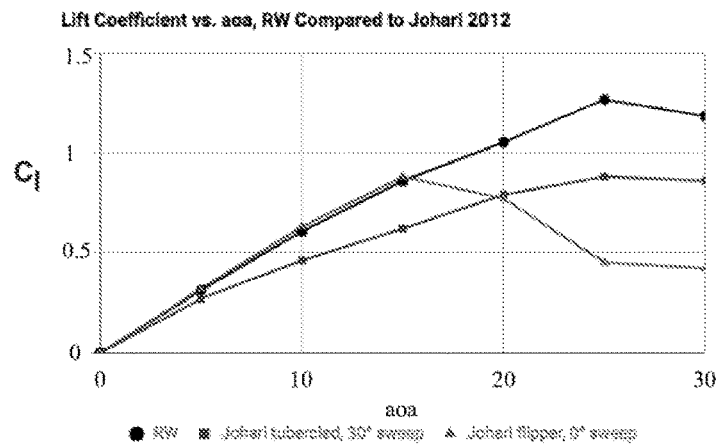
FIG. 19A is a graph of CFD results comparing lift coefficients vs. angle of attack of prior research at similar low Reynolds numbers and similar airfoil shapes to the Real Whale 30 results.
Figure 19B:
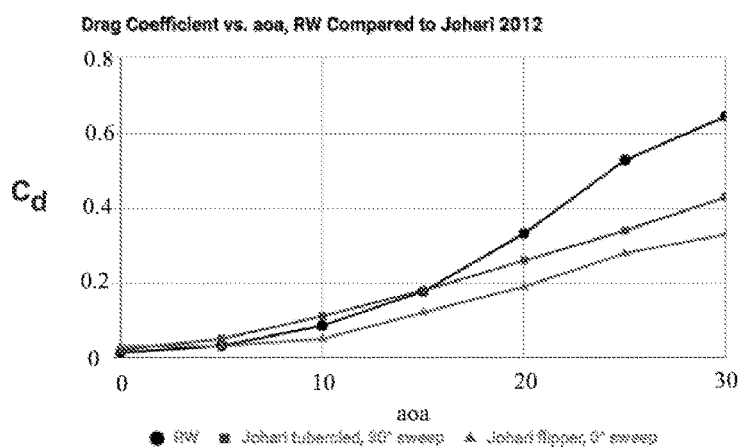
FIG. 19B is a graph of CFD results comparing drag coefficients vs. angle of attack of prior research at similar low Reynolds numbers and similar airfoil shapes to the Real Whale 30 results.
Figure 19C:
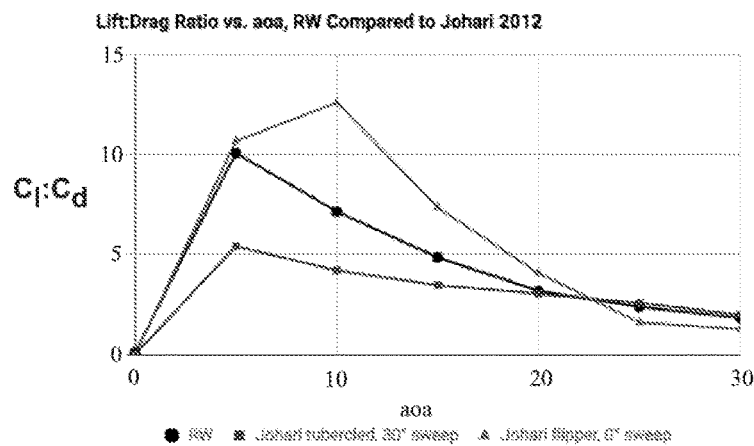
FIG. 19C is a graph of CFD results comparing lift:drag ratios vs. angle of attack of prior research at similar low Reynolds numbers and similar airfoil shapes to the Real Whale 30 results.

FIGS. 19A-19C compare the Real Whale 30 model low Re results to prior research (Johari 2012) on tubercled hydrofoils conducted in a water tunnel at near-identical Reynold's numbers ($2.7 \cdot 10^5$) to those tested in FIGS. 17A-17D. One hydrofoil (Johari swept) had 4 tubercles, a 26.1° sweep angle, and AR=2.01. The other model (Johari flipper) was similar to an unswept version of the Control+Tubercles 40 model, with 8 tubercles, a 00 sweep angle, and AR=4.43. Like the Real Whale 30 model, both Johari models were uncambered.

The Real Whale 30 model followed the Johari swept wing the closest, with peak lift:drag at about 5° aoa, and stall at about 25° aoa. Comparing peak lift coefficients (FIG. 19A), the Real Whale 30 model was 43.2% higher than both the Johari swept and flipper models. The reduced lift:drag ratio (FIG. 19C) of the Real Whale 30 model compared to the flipper model could be a result of sweep angle, as research shows increasing the sweep angle on tubercled hydrofoils reduces maximum lift:drag (see Johari 2012). However, the overall higher lift and drag coefficients (FIGS. 19A and 19B) of the Real Whale 30 model compared to the Johari swept and flipper models suggest it was "doing more" with the water than the other designs, further confirming that inclusion of other passive flow control devices besides tubercles may be important in some embodiments. For a humpback whale to feed effectively, it is reasonable to assume its pectoral fins are designed to generate as much lift as possible, as efficiently as possible, without stalling, over as wide a range of conditions as possible.

Comparing FIGS. 17A-19C over the range of angles of attack tested, in FIGS. 17A-17C the Real Whale 30 model had decreased lift (unfavorable), decreased drag (favorable) and increased lift:drag (favorable) compared to the Control 60 model and the Control+Tubercles 40 model. Differences in maximum lift were not significant. In FIGS. 19A-19C, the Real Whale 30 model had increased lift (favorable), increased drag (unfavorable), increased lift:drag compared to the Johari swept model (significant, 31% mean increase) and decreased lift:drag compared to the Johari flipper model (insignificant, 1.9% mean decrease). Therefore, it appears that, compared to other tubercled hydrofoils operating at equal Re, the Real Whale 30 model provides the best overall performance.

TABLE 5

| Reynold's Numbers relative to mean aerodynamic chord, and associated flow speeds in meters per second | C 60 (AR = 4.5) | CT 40 (AR = 4.9) | RW 30 (AR = 5.0) |
|---|---|---|---|
| Low Re: $2.76 \cdot 10^5$ | 2.41 | 2.6 | 3.0 |
| High Re: $1.8 \cdot 10^6$ | 15.7 | 17.0 | 20.0 |

As mentioned previously, the humpback whale also uses its pectoral fins as rotors, sweeping them rapidly forward to generate upwards lift during lunge feeding or breaching, or downward lift for diving. To test rotational aspects of embodiments of the present invention, models 61, 41, 31 shown in FIGS. 16A-16C were designed in Onshape™ software and 3D printed by Protolabs, Inc. (Maple Plain, Minn.) using Duraform™ HST laser sintering material (3D Systems, Inc., Rock Hill, S.C.). All blades were hand-sanded to a smooth finish and spray painted with a light coating of PlastiDip™ material (PlastiDip International, Blaine, Minn.) to (1) seal pores that occur in laser sintering and (2) make them waterproof.

The Control 61, Control+Tubercles 41, and Real Whale 31 turbine blades are basically unswept versions of their counterparts 60, 40, 30 shown in FIGS. 15A-15C, modified for mounting on a Sky-Z™ experimental wind turbine kit designed by PicoTurbine International (Jersey City, N.J.). A 3-blade setup was used, with three equally spaced blades on each turbine. All blades had a semi-span of 150 mm (see Table 6 for blade volumes and AR), which matched the span of the blades provided in the kit. One reason this kit was chosen was because it allowed for blade pitch variation. The rotor hub had pitch angles etched at 00, 100 and 20°, which facilitated in adjusting pitch angles and estimating midway between (5° and 15°). A 12 V DC motor was used as a generator (RS-360 model produced by Shenzhen Funtain Motor Co., Ltd., Shenzhen, China). The generator was connected to a PS-2115 voltage/current datalogger available from Pasco Scientific (Roseville, Calif.). The current sensor was connected in series with a 30 or 60 ohm resistor, and the voltage sensor was connected in parallel across the resistor. Data was recorded using Pasco Scientific's Capstone™ software.

benefits in unsteady, low speed flows that occur at blade cut-in velocities. Such conditions will mimic post-stall behavior, the same conditions where the Real Whale 30 and 31 blades showed some of their biggest performance increases over both smooth and tubercled leading edge blades. A lower cut-in velocity means the Real Whale 31 blades operate over a greater range of wind speeds. And a faster response time means it takes less time for the Real Whale 31 blades to reach peak power output. A lighter blade that produces the same amount of power has other advantages as well, such as reduced stress and strain on mechanical systems.

TABLE 7

| parameter | C 61 | CT 41 | RW 31 | RW:C % Increase | RW:CT % Increase |
|---|---|---|---|---|---|
| Mean Wind Speed (mps) | 2.46 | 2.46 | 2.46 | 0 | 0.0 |
| Mean Tip Speed (mps) | 25.3 | 25.1 | 25 | −1.2 | −0.4 |
| Mean TSR | 10.32 | 10.27 | 10.19 | −1.3 | −0.8 |
| Mean Power (watts) | 0.151 | 0.146 | 0.151 | 0.0 | 3.4 |
| Mean $C_p$ | 0.12 | 0.116 | 0.12 | 0.0 | 3.4 |
| Mean $C_p$ per m^3 blade volume | 1351 | 1428 | 1644 | 21.7 | 15.1 |
| Max $C_p$, all 5° aoa settings | 0.129 | 0.121 | 0.13 | 0.8 | 7.4 |
| Cut-in Velocity, estimate(mps) | 2.460 | 2.46 | 2.14 | −13.0 | −13.0 |
| mean response time(s) | 51.5 | 53.9 | 46.3 | −10.1 | −14.1 |

TABLE 6

| | C 61 | CT 41 | RW 31 |
|---|---|---|---|
| volume (m³) | 0.0000297 | 0.000027 | 0.0000244 |
| AR | 7.99 | 8.50 | 8.93 |

For the wind turbine experiment, wind was generated with a Lasko™ 3-speed, 18-inch pedestal fan (Lasko Products, LLC, West Chester, Pa.). The center of the fan was aligned with the center of the turbine. A Turbometer™ wind speed indicator (Davis Instruments, Vernon Hills, Ill.) was used to measure wind speeds for each fan setting. Speeds from 10 locations upstream of the wind turbine's circular sweep area were measured and averaged. Preliminary tests on pitch angles of 5°, 10°, 15° and 20° showed that a 5° pitch angle produced the highest power output, so this pitch angle was used. A Nova Strobe DA Plus™ stroboscope (Mitchell Instruments, San Marcos, Calif.) was used to measure blade rotation rates. Blade rotation rates were used to calculate tip speed ratios, or TSRs, the ratio of tip speed to flow speed. TSR is used as a measure of the operating efficiency of wind and tidal turbines.

Table 7 lists results of the wind turbine experiment. The mean tip speed ratios (TSR) were almost identical, suggesting the blades were operating at similar efficiencies. The Real Whale 31 model's mean power output and power coefficient were either the same or slightly higher than the other designs. The most significant differences were found when comparing the mean power coefficient per unit volume of blade. This result suggests that, for its size, the Real Whale 31 model produced up to 21.7% more power. Because all blades were made with the same material, this means that the Real Whale 31 blade is significantly lighter, resulting in a lower moment of inertia, which may partly explain why it's estimated cut-in velocity (the airspeed at which the turbine begins to turn) is 13% lower than the other models, and its response time is up to 14.1% faster.

Experts (see Miklosovic et. al 2007 below) also conclude that tubercled blades may reveal some of their biggest For the tidal turbine experiments, the DC motor was waterproofed per instructions in the MIT Sea Grant's (Cambridge, Mass.) Sea Perch Construction Manual (2011, see below). An apparatus was constructed to mount the turbine to the side of a center console boat with a 225 hp Yamaha VMax™ motor (Yamaha Motor Corporation, USA, Kennesaw, Ga.). To conduct a test, the throttle was pushed to the forward position, just out of neutral, providing a speed of about 1 mps. Boat speeds were measured using a Lowrance HDS™ GPS/Depthfinder (Lowrance Electronics, Tulsa, Okla.). A GoPro Hero 5™ video camera (GoPro Inc., San Mateo, Calif.) was used to record the GPS/Depthfinder screen during the experiment and also observe turbine operation and calculate tip speeds. For each blade tested, the datalogger was turned on, followed by initiating forward motion. Then the camera was turned on and moved between the turbine, the GPS/Depthfinder screen, and a Macbook Air™ laptop computer (Apple Inc., Cupertino, Calif.) displaying the turbine's power output. Afterwards, the video was reviewed to calculate a mean speed based on 10 speed observations, and mean tip speeds based on 10 observations of rotation rate. The camera was recording 60 frames per second. One observation of rotation rate involved estimating the number of frames required to complete 1 revolution, rounded to 1 decimal place. Also, preliminary tests showed that, like the wind turbine tests, a 5° pitch angle produced the highest power output, so this pitch angle was used.

Although the tidal turbine setup was not ideal compared to a high performance water tunnel, it probably provided more realistic conditions (i.e., turbulent flow), for turbine operation. Table 8 lists the tidal turbine results collected in an enclosed bay, where wind and wave influences were low. Although turbine mount malfunctioning prevented collection of Control+Tubercles 41 turbine data, a comparison of the Real Whale 31 to the Control 61 showed no significant difference in water flow speeds and slightly more efficient TSR for the Real Whale 31. Even though the two designs were operating at similar speeds and TSRs, the Real Whale 31 had a large, 14.8% increase in mean power coefficient, and a very large, 39.7% increase in power coefficient per unit volume.

TABLE 8

| parameter | C 61 | RW 31 | RW:C % Increase |
|---|---|---|---|
| Mean Flow Speed (mps) | 1.22 | 1.2 | −1.639344262 |
| Mean Tip Speed (mps) | 7.83 | 7.98 | 1.915708812 |
| Mean TSR | 6.42 | 6.64 | 3.426791277 |
| Mean Power (watts) | 0.0175 | 0.0192 | 9.714285714 |
| Mean $C_p$ | 0.000149 | 0.000171 | 14.76510067 |
| Mean $C_p$ per m^3 blade volume | 1.672278339 | 2.336065574 | 39.69358565 |

Table 9 lists the tidal turbine results collected in the open Pacific Ocean, where wind and wave influences were greater (i.e., more turbulence) than Table 8 data. The conditions made it more difficult to maintain a constant speed and heading. This resulted in more significant differences in flow speeds and TSRs. Again though, the Real Whale 31 model had a large, 21.7% increase in mean power coefficient compared to the Control 61 model, and a 13.5% increase compared to Control+Tubercles 41 model. Very large increases in power coefficients per unit volume were also recorded. Although there was more variability in the open ocean test, results show the Real Whale 31 model significantly outperformed the other designs.

TABLE 9

| parameter | C 61 | CT 41 | RW 31 | RW:C % Increase | RW:CT % Increase |
|---|---|---|---|---|---|
| Mean Flow Speed (mps) | 1.055 | 1.001 | 0.903 | −14.4 | −9.8 |
| Mean Tip Speed (mps) | 8.4 | 7.09 | 7.36 | −12.4 | 3.8 |
| Mean TSR | 7.97 | 7.08 | 8.15 | 2.3 | 15.1 |
| Mean Power (watts) | 0.0137 | 0.0126 | 0.0105 | −23.4 | −16.7 |
| Mean $C_p$ | 0.00018 | 0.000193 | 0.000219 | 21.7 | 13.5 |
| Mean $C_p$ per m^3 blade volume | 2.02 | 2.38 | 2.99 | 48.0 | 25.6 |

For both wind and tidal turbine tests, the main purpose was to test the relative influence of a humpback's passive flow control devices, and not to create a wind or tidal turbine for maximum power output. For reference, the maximum power coefficient of any turbine is $C_p=0.593$, referred to as the Betz limit. Artisans skilled in the art of turbine power production would likely find better blade/generator combinations than were used here in order to extract more power from the fluid (e.g., blades with twist and/or camber). Also, cut-in velocities and response times were not measured for the tidal turbine setups because the blades would start turning at speeds lower than could be reasonably estimated with GPS. Most likely, because of the lighter weight, when used as tidal turbine blades the Real Whale 31 blades would have similar startup benefits to wind turbines (see Table 7).

Although the above results show promise for an almost limitless variety of fixed wing and rotational embodiments of the design described herein, the original intent of the present inventor was to look to creation to build a better surfing fin. Surfers and humpbacks alike require designs that allow them to maintain high maneuverability in often-turbulent conditions experienced near the ocean's surface. They need fins that will grab the water, direct it, and "do something" with it to start providing lift immediately at low speeds, and then maintain it at high speeds and high angles of attack. They also need their fins to be as light as possible, which reduces the torque required to initiate movement.

Surfing fin tests are more qualitative than quantitative, because every surfer has a different style, different board and fin setups, etc. Not only that, ocean conditions are highly variable, so one wave can be extremely different from the next. To test surfing fins, two designs were 3D printed by Protolabs, Inc. using Duraform™ HST laser sintering material: (1) a larger fin used for longboards and stand-up paddle boards similar to the Real Whale 30 model, and (2) a high performance shortboard fin 186 (FIG. 20D) embodying some aspects of the present invention. Carbon fiber replicas of each design were created by Nate Knaggs of Haleiwa, Hi.

The present inventor tested the longboard fin, and while the present inventor's skill level is low compared to a professional surfer, the inventor noted that when used in "winter swell" on Oahu's North Shore, the fin is responsive and allows for smooth, carving turns on wave faces from waist high to slightly overhead.

To test the high performance shortboard fins, a 3-fin setup was used, consisting of two thruster fins and one center fin. The fins were similar to fin 186 in FIG. 20D. Two surfers tested the fins in various conditions on Oahu's North Shore. Josiah Swanson (Haleiwa, Hi.), a teen with advanced skill, tested them in waist to head high waves. Sergio Lima (Haleiwa, Hi.), a former professional surfer and owner of Island Style Surf School (Haleiwa, Hi.), tested the fins in waist to head-high waves, but also in much more powerful, overhead to double-overhead waves.

Both surfers noted that the fins seemed to provide faster acceleration at takeoff than other fins. In surfing, it is important that, at takeoff, the surfer get moving and transition from lying flat on the board to standing up. Faster acceleration would be beneficial at this point, and would give the surfer more confidence that he will be able to commit to the wave and have a successful ride. When making sharp, powerful turns at the tops of waves, both surfers noted one favorable improvement was the increase in the amount of water thrusted or "sprayed" skyward, suggesting that the tubercles and other channelizing features (e.g., crenulations, max chord thickness distribution, non-periodic variation of chord thickness), as well as delayed stall characteristics, were holding the water better than standard fins. In the smaller wave conditions, Josiah noted an improvement in the ability to perform a tail slide maneuver at the top of a wave.

Sergio Lima tested two arrangements of fins. In Arrangement 1, all three fins were built similar to fin 186 in FIG. 20D. This design excluded the use of FIGS. 10 and 13 and associated methods to create a more whale-like root trailing edge with max trailing edge curvature 14. Instead, the fins were designed more like standard surfing fins, with a maximum chord length at the root. When tested in powerful waves, Sergio noticed a decreased ability to make a sharp turn. This may have been caused by two factors: (1) the delayed stall of tubercled designs prevented the fins from stalling, which could also limit their ability to slide through a turn, and (2) the increased surface area at the root compared to a more whale-like fin would create more resistance to a sideways turn. The problem was resolved with Arrangement 2, in which a more whale-like root trailing edge, per FIGS. 10 and 13 and associated methods, was added to the two thruster fins.

In comparing the Arrangement 2 fins to standard fins, Sergio noted similar performance in smaller waves, but a notable improvement in larger, more powerful conditions. In overhead to double overhead waves, Sergio noted that the fins provided plenty of speed, improved takeoffs, more speed and stability in fast barrels, and more ability to make powerful, carving turns. Others have also noted more stability while using fins with features that channelize flow (U.S. Pat. No. 9,669,905 B1). As with other embodiments, the high performance fins of Arrangement 2 provided similar or better results using less material.

While more research and testing may be performed, it appears embodiments of the present invention work well as surfing fins. That they seem to work even better in faster, more powerful conditions matches the CFD results that showed more favorable results in high Re flows. That they seem to provide faster acceleration at start up matches the wind turbine results, which showed the Real Whale embodiments tend to "do something" with the fluid at a slower speed than other designs.

Although more research on different embodiments of the present invention will likely reveal additional insights, it is the inventor's belief that passive flow control devices as described herein can provide a significant improvement to the performance of a variety of airfoil-shaped bodies operating over a wide range of speeds and flow conditions ranging from smooth to turbulent. The patterns of tubercles and crenulations introduce streamwise vortices near the leading edge and trailing edge, respectively. The tubercle-generated vortices are especially important when the boundary layer becomes turbulent at high Re. The vortices re-energize the boundary layer, which allows for lift to continue over a wider range of operating conditions. The insignificant difference in maximum lift, significantly reduced drag, improved lift:drag ratios and significant increases in lift and power output per unit volume of the Real Whale 30 shape, over a wider range of speeds and angles of attack, provides many benefits, including more efficient maneuvering, which may help explain why humpbacks are so acrobatic for their size. The improved power output in a rotational setting would also benefit a humpback during feeding, allowing it to rapidly generate power to overcome inertia.

The tubercles and crenulations aid in reducing tip vortex strength and associated induced drag by compartmentalizing low pressure regions (see, e.g., U.S. Pat. No. 6,431,498) which, in effect, breaks the airfoil-shaped body into several discrete sections. The non-periodic pattern of the tubercles and crenulations can also create vortices that tend to cancel one another, further reducing drag and turbulence (and noise) around the airfoil. Flow compartmentalization is especially useful in environments where the flow is already turbid, as the tubercles can compartmentalize (i.e., decorrelate) turbulent fluids by forcing them into separate channels (see, e.g., U.S. Pat. No. 2013/0164488). It is the inventor's belief that the non-periodic variation in spanwise chord thickness 20 also assists in compartmentalizing flow. Finally, the more forward-directed maximum airfoil thickness near the root is known by those skilled in the art to reduce interference drag at the airfoil/body intersection. It is perhaps for some or all of these reasons why the Real Whale design showed some of its best performance enhancements in the unsteady flow conditions of the tidal turbine tests, as well as stall conditions that occur near blade cut-in velocities. In a more controlled CFD test or wind/water tunnel test, unsteady incoming flow is the exception. In real situations though, it's the rule.

Figure 21:
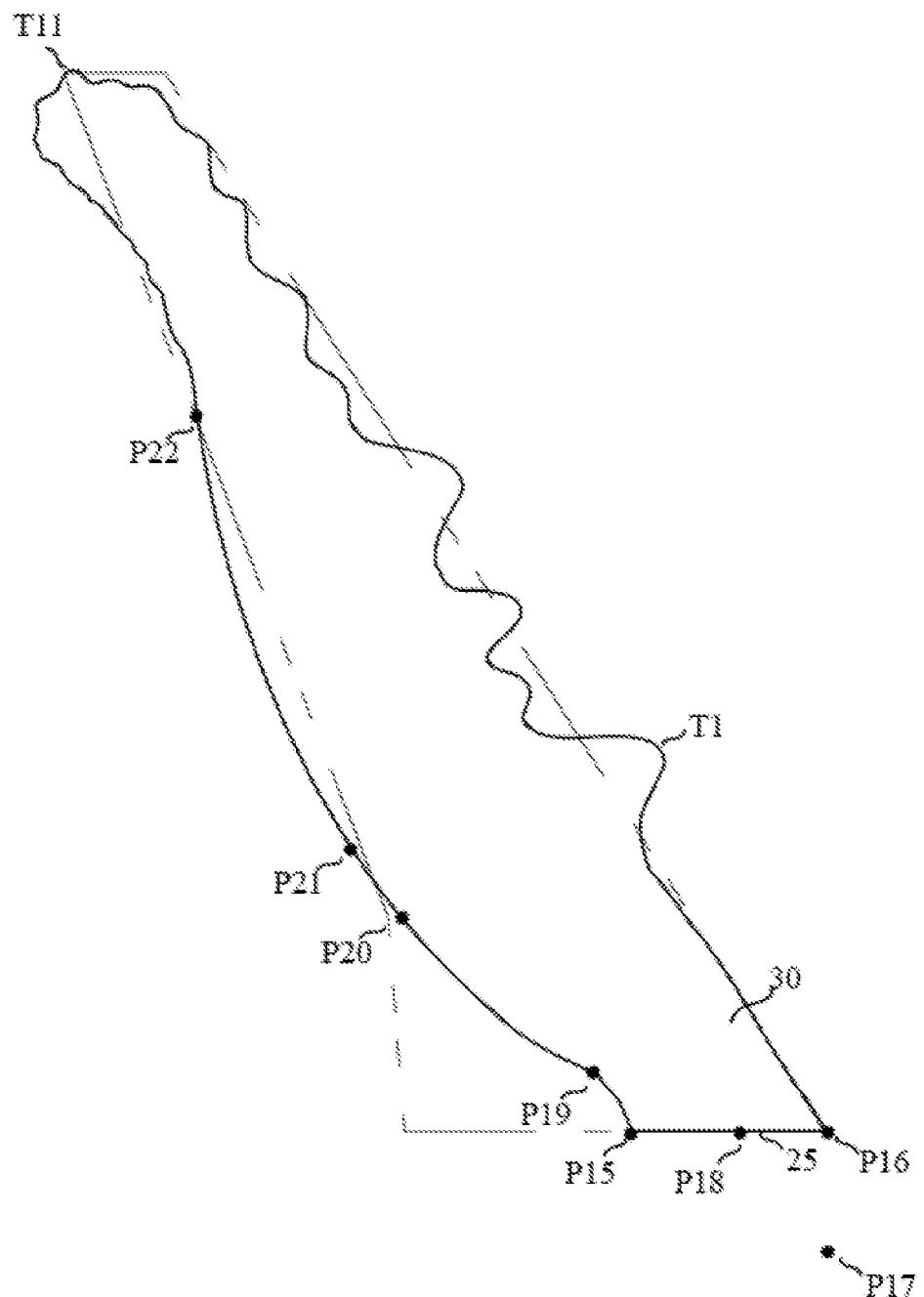
FIG. 21 is a top plan view of an airfoil configured with tubercles, crenulations and other features as described herein adapted from a conventional business jet wing.

While some preferred embodiments of the invention have been shown and described, it will be apparent to those skilled in this art that various modifications may be made in such embodiments without departing from the teachings of the present invention. Just as no two humpback whales are alike, the present invention allows for both unity and diversity in design. FIGS. 20A, 20B, 20C, and 20D show some applications of the airfoil 30 to various airfoil-shaped bodies, including, but not limited to, an unmanned aerial vehicle (UAV) 180, a surfing fin 182 similar to the longboard/stand up paddle fin described above, a propeller 184, and another surfing fin 186 described above. FIG. 21 illustrates an application of the airfoil 30 to a conventional business jet wing, where the jet wing's leading edge, not divine spiral S1 as shown in FIG. 6, was used to place the tubercles per Table 2. Of course, many other applications may be made. The present invention is defined by the appended claims, considering the doctrine of equivalents, and should not be limited to the embodiments described herein.

| REFERENCES (each of which is incorporated herein by reference) | |
|---|---|
| U.S. Pat. No. 5,088,665 A | February 1992 Paul et al. |
| U.S. Pat. No. 5,901,925 | May 1999 McGrath et al. |
| U.S. Pat. No. 6,431,498 B1 | August 2002 Watts et al. |
| U.S. Pat. No. 7,244,157 B2 | July 2007 Simpson |
| U.S. Pat. No. 9,341,158 A1 | June 2013 Smith et al. |
| U.S. Pat. Pub. No. 2013/0164488 A1 | June 2013 Wood et al. |
| U.S. Pat. No. 8,535,008 B2 | September 2013 Dewar et al. |
| U.S. Pat. No. 9,308,418 B2 | April 2016 Davis et al. |
| U.S. Pat. No. 9,669,905 B1 | June 2017 Pierce et al. |

Aftab, S. M. A., N. A. Razak, A. S. Mohd Rafie, and K. A. Ahmad. 2016. *Mimicking the humpback whale: An aerodynamic perspective*. Progress in Aerospace Sciences, 84: 48-69.

Abbott, I. H., A. E. von Doenhoff, and L. S. Stivers, Jr. 1945. *Summary of Airfoil Data*. National Advisory Committee for Aeronautics. Report No. 824. 264 pp.

Fish, F. E., and J. M. Battle. 1995. *Hydrodynamic Design of the Humpback Whale Flipper*. Journal of Morphology, 225: 51-60.

Hansen, K. L., R. M. Kelso, and B. B. Dally. *Performance variations of leading-edge tubercles for distinct airfoil profiles*. Journal of Aircraft, 49(1):185-194, 2011.

Hansen, K. L., R. M. Kelso and C. Doolan. 2012. *Reduction of Flow Induced Airfoil Tonal Noise Using Leading Edge Sinusoidal Modifications*. Acoustics Australia, 40(3): 172-177.

Johari, H. 2012. *Application of Hydrofoils with Leading Edge Protuberances*. Final Technical Report for Office of Naval Research contract N00014-08-1-1043. 124 p.

Miklosovic, D. S., M. M. Murray, L. E. Howle, and F. E. Fish. 2004. *Leading-edge tubercles delay stall on humpback whale (Megaptera novaeangliae) flippers*. Physics of Fluids, 16(5): L39-42.

Miklosovic, D. S., M. M. Murray, and L. E. Howle. 2007. Experimental Evaluation of Sinusoidal Leading Edges. J. of Aircraft, 44(4): 1404-1407.

MIT Sea Grant. 2011. *Sea Perch Construction Manual*. http://seaperch.mit.edu/docs/seaperch-build-october2011.pdf.

Shi, W., M. Atlar, R. Norman, B. Aktas and S. Turkmen. 2015. *Biomimetic Improvement for a Tidal Turbine*. Proceedings of the 11th European Wave and Tidal Energy Conference. 07B3-5-1-6.

What is claimed is:

1. An airfoil body comprising:
   a plurality of tubercles along a leading edge of said airfoil body; and
   a plurality of crenulations along a trailing edge of said airfoil body;
   wherein at least one of a position, a size, and a shape of said plurality of tubercles said plurality of crenulations varies in a non-periodic fashion comprising a Fibonacci proportion.

2. The airfoil body of claim 1 wherein said plurality of tubercles comprises 13 tubercles T1-T13.

3. The airfoil body of claim 2 wherein said plurality of tubercles comprises 8 primary tubercles T1, T4, T6, T7, T8, T9, T10, and T11 having peaks respectively located within about ±0.05 of the following proportions: 0.38, 0.62, 0.76, 0.86, 0.9, 0.95, 0.95, 1.0; said proportions being defined with respect to a maximum span segment between a pivot point located inboard from a root chord of said airfoil body and said peak of said tubercle T11.

4. The airfoil body of claim 3 wherein said non-periodic fashion is at least partially representative of a modified Fibonacci function as set forth in the following equation:

$$FM_x = \left| \frac{0.1\phi}{\sqrt{5}} \left\{ (\phi)^{-x} - \left(\frac{1}{\phi}\right)^{-x} \cos\left(\left(\frac{360}{137.5}\right)\pi(-x)\right) \right\} \right|^{\frac{1}{\phi}}$$

and wherein said tubercles T1-T13 are configured within about ±0.05 of the SK/W, AF/W, and A/AF proportions respectively listed in the following table:

|      | T1   | T2  | T3   | T4   | T5  | T6  | T7  | T8  | T9  | T10 | T11 | T12 | T13 |
|------|------|-----|------|------|-----|-----|-----|-----|-----|-----|-----|-----|-----|
| SK/W | .45  | .45 | .45  | .45  | .38 | .45 | .45 | .45 | .45 | .5  | .45 | .62 | .62 |
| AF/W | .12  | .26 | .22  | .19  | .38 | .30 | .34 | .30 | .38 | .33 | .45 | .45 | .33 |
| A/AF | 3.24 | .62 | 1.62 | 2.24 | .5  | 1   | 1   | 1   | 1   | 1   | 1   | 1   | 1   |

5. The airfoil body of claim 4 wherein said plurality of crenulations comprises 8 crenulations C1-C8 and further comprising a max chord trailing edge curvature;
   wherein said crenulations C1-C8 and said max chord trailing edge curvature are configured within about ±0.05 of the SK/W, AF/W, and A/AF proportions respectively listed in the following table:

|      | C1  | C2  | C3  | C4  | C5  | C6  | C7  | C8  | Max chord trailing edge curvature |
|------|-----|-----|-----|-----|-----|-----|-----|-----|------|
| SK/W | .38 | .5  | .38 | .45 | .38 | .5  | .38 | .38 | .62  |
| AF/W | .33 | .22 | .19 | .2  | .23 | .16 | .09 | .01 | .11  |
| A/AF | 1   | 1   | 1   | 1   | 1   | 1   | 1   | 1   | 1    |

6. The airfoil body of claim 5 wherein at least some of said tubercle pears are located on a divine spiral.

7. The airfoil body of claim 5 wherein at least some of said crenulations comprise peaks located on a divine spiral.

8. The airfoil body of claim 3 further comprising a root chord of length R intersected by said maximum span segment such that said root chord is divided into a forward segment G and an aft segment, wherein R/G is between about 1.618 and about 3.236.

9. The airfoil body of claim 8 further comprising a plurality of chords having a nonlinear spanwise variation of max chord thickness.

10. The airfoil body of claim 9 wherein said max chord thickness varies within about ±0.05 of the proportions as set forth in the following table:

|  | Chord Location | | | | | | | | | |
|---|---|---|---|---|---|---|---|---|---|---|
| Max Thickness Proportions | 25 | KR | KB | K1 | K2 | K3 | K4 | K5 | K6 | K9 |
| Max thickness [MT] in proportion to root chord [25] max thickness | 1 | 1.2 | .95 | 1 | .84 | .79 | .71 | .70 | .62 | .21 |
| Location of max thickness [MT] (% from leading edge) | 31 | 32 | 32 | 38 | 26 | 30 | 38 | 37 | 43 | 50 | wherein said root chord 25 is located by a leading edge point P16;

wherein said chord KR is located by a leading edge point P141;

wherein said chord KB is located by a leading edge point P142;

wherein (P142−P16)/(P141−P16) is about 1,618; and wherein said chords K1, K2, K3, K4, K5, 1(6, and K9 are respective v locate by leading edge points associated with said tubercles T1, T2, T3, T4, T5, T6, and T9.

11. A method of making an airfoil body having a plurality of tubercles along a leading edge of said airfoil body and a plurality of crenulations along a trailing edge of said airfoil body, said method comprising:

establishing a leading edge point of a root chord of said airfoil body;

establishing a pivot point inboard of said root chord;

establishing a max span point corresponding to a peak of an outermost tubercle;

establishing said plurality of tubercles and said plurality of crenulations based on Fibonacci proportions with respect to a maximum span segment between said pivot point and said max span point; and making said airfoil body.

12. The method of claim 11 further comprising establishing a max chord trailing edge curvature location using a divine triangle having a first vertex at said pivot point, a second vertex at a first tubercle peak, and a third vertex at said max chord trailing edge curvature location.

13. The method of claim 11 further comprising using one or more divine spirals to locate peaks of at least some of said plurality of tubercles and at least some of said plurality of crenulations.

14. The method of claim 11 further comprising establishing a nonlinear spanwise variation of max chord thickness of said airfoil body.

15. An airfoil body comprising at least one of (a) a plurality of leading edge tubercles arranged in Fibonacci proportions and (b) a plurality of trailing edge crenulations arranged in Fibonacci proportions.

16. The airfoil body of claim 15 further comprising a non-linear spanwise variation of max chord thickness.

17. The airfoil body of claim 16 wherein said airfoil body comprises a root chord and a maximum chord thickness, and wherein said maximum chord thickness is outboard of said root chord.

18. An airfoil body comprising a planform shape defined at least in part by at least one divine spiral, wherein said planform shape further comprises at least one of (a) a plurality of leading edge tubercles arranged in Fibonacci proportions and (b) a plurality of trailing edge crenulations arranged in Fibonacci proportions.

19. The airfoil body of claim 18 wherein said planform shape comprises a leading edge defined at least in part by a first divine spiral, a tip defined at least in part by a second divine spiral, and a trailing edge defined at least n pa t by a third divine spiral.

20. The airfoil body of claim 19 wherein said planform shape further comprises a max trailing edge curvature defined at least in part by a fourth divine spiral.

* * * * *

UNITED STATES PATENT AND TRADEMARK OFFICE
CERTIFICATE OF CORRECTION

PATENT NO. : 10,858,088 B2  
APPLICATION NO. : 15/689831  
DATED : December 8, 2020  
INVENTOR(S) : David E. Shormann Page 1 of 1

It is certified that error appears in the above-identified patent and that said Letters Patent is hereby corrected as shown below:

In the Claims

In Column 25, Line 7, Claim 10, delete "1,618" and insert --1.618-- therefor.

In Column 25, Line 8, Claim 10, delete "1(6" and insert --K6-- therefor.

In Column 25, Line 9, Claim 10, delete "respective v locate" and insert --respectively located-- therefor.

In Column 26, Line 26, Claim 19, delete "n pa t" and insert --in part-- therefor.

Signed and Sealed this  
Ninth Day of February, 2021

Drew Hirshfeld  
*Performing the Functions and Duties of the*  
*Under Secretary of Commerce for Intellectual Property and*  
*Director of the United States Patent and Trademark Office*